United States Patent
Ogawa

(10) Patent No.: US 11,184,550 B2
(45) Date of Patent: Nov. 23, 2021

(54) IMAGE CAPTURING APPARATUS CAPABLE OF AUTOMATICALLY SEARCHING FOR AN OBJECT AND CONTROL METHOD THEREOF, AND STORAGE MEDIUM

(71) Applicant: CANON KABUSHIKI KAISHA, Tokyo (JP)

(72) Inventor: Shigeo Ogawa, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/700,795

(22) Filed: Dec. 2, 2019

(65) Prior Publication Data

US 2020/0186721 A1 Jun. 11, 2020

(30) Foreign Application Priority Data

Dec. 6, 2018 (JP) .............................. JP2018-229210

(51) Int. Cl.
*H04N 5/232* (2006.01)
*G06K 9/20* (2006.01)
(Continued)

(52) U.S. Cl.
CPC ..... *H04N 5/23299* (2018.08); *H04N 5/23218* (2018.08); *H04N 5/23238* (2013.01); *H04N 5/23296* (2013.01)

(58) Field of Classification Search
CPC ........... H04N 5/23299; H04N 5/23296; H04N 5/23238; H04N 5/23218; H04N 5/2328;
(Continued)

(56) References Cited

U.S. PATENT DOCUMENTS

| 6,734,911 | B1* | 5/2004 | Lyons ................... H04N 5/232 348/340 |
| 2004/0101212 | A1* | 5/2004 | Fedorovskaya .... H04N 5/23219 382/305 |

(Continued)

FOREIGN PATENT DOCUMENTS

| CN | 105744149 A | 7/2016 |
| CN | 106605404 A | 4/2017 |

(Continued)

OTHER PUBLICATIONS

The above patent documents were cited in a Jul. 5, 2021 Chinese Office Action, which is enclosed with an English Translation, that issued in Chinese Patent Application No. 201911241530.4.

*Primary Examiner* — Albert H Cutler
(74) *Attorney, Agent, or Firm* — Cowan, Liebowitz & Latman, P.C.

(57) ABSTRACT

An image capturing apparatus includes an image capturing device configured to capture an object image, a determining unit configured to determine an area to search for an object in the image data captured by the image capturing device, a zoom unit configured to change the shooting angle of view of the image capturing unit, and a control unit configured to carry out control so that the zoom unit changes the shooting angle of view of the image capturing device to a wide-angle side when the determining unit determines the area to search for the object.

15 Claims, 13 Drawing Sheets

(51) Int. Cl.
*G06K 9/32* (2006.01)
*H04N 5/225* (2006.01)

(58) Field of Classification Search
CPC ........... H04N 5/23219; H04N 5/23258; H04N 5/23241; H04N 5/232411; H04N 5/2251; H04N 5/2254; H04N 5/23212; H04N 5/23203; G06K 9/2054; G06K 9/32; G01S 3/00
See application file for complete search history.

(56) References Cited

U.S. PATENT DOCUMENTS

| | | | |
|---|---|---|---|
| 2011/0102454 A1* | 5/2011 | Miyakoshi | H04N 5/23219 345/589 |
| 2011/0285808 A1* | 11/2011 | Feng | H04N 7/147 348/14.09 |
| 2012/0057786 A1* | 3/2012 | Yano | H04N 5/23219 382/170 |
| 2013/0188045 A1* | 7/2013 | Kalevo | G06T 7/194 348/143 |
| 2016/0142640 A1* | 5/2016 | Niida | H04N 5/23219 348/240.3 |
| 2017/0064180 A1* | 3/2017 | Kitagawa | G06K 9/00771 |
| 2017/0134643 A1* | 5/2017 | Kim | G06K 9/00281 |
| 2018/0082144 A1 | 3/2018 | Wakamatsu | |

FOREIGN PATENT DOCUMENTS

| | | |
|---|---|---|
| CN | 107079087 A | 8/2017 |
| CN | 107105152 A | 8/2017 |
| CN | 107862243 A | 3/2018 |
| JP | 5453953 B2 | 3/2014 |
| JP | 2016-536868 A | 11/2016 |
| WO | 2015/055655 A1 | 4/2015 |

\* cited by examiner

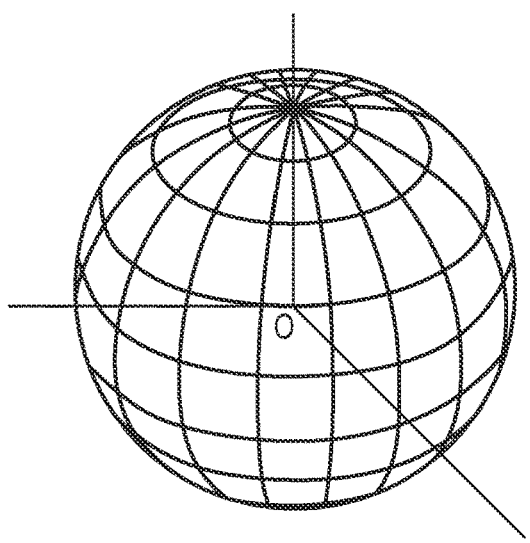
F I G. 10A
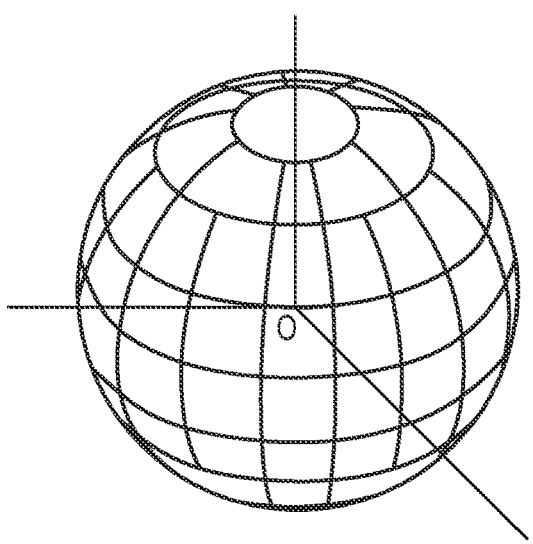
F I G. 10B
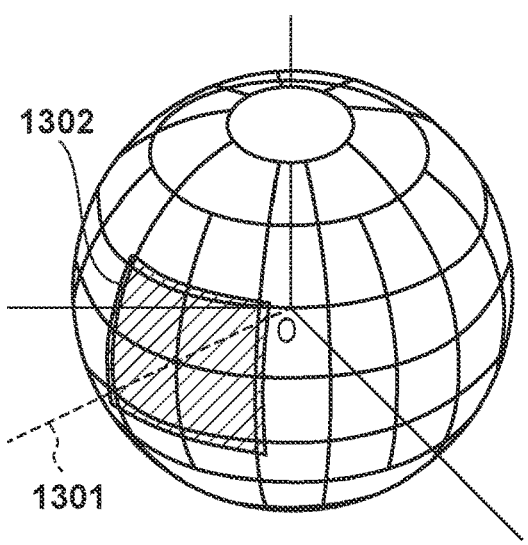
F I G. 10C
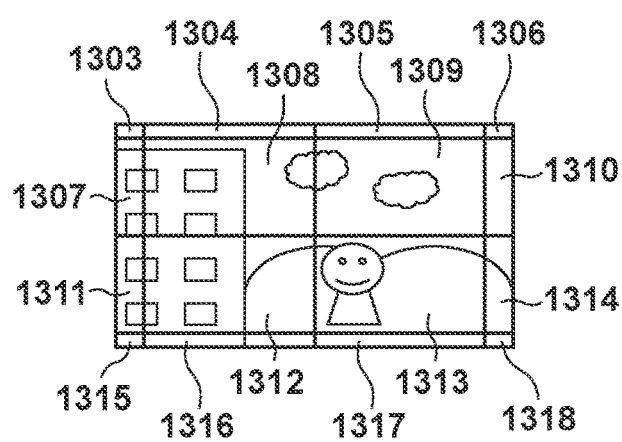
F I G. 10D
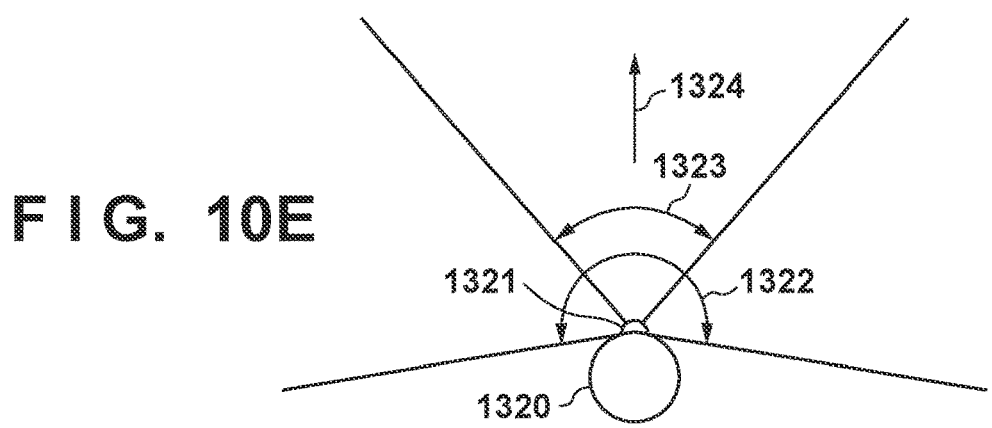
F I G. 10E

IMAGE CAPTURING APPARATUS CAPABLE OF AUTOMATICALLY SEARCHING FOR AN OBJECT AND CONTROL METHOD THEREOF, AND STORAGE MEDIUM

BACKGROUND OF THE INVENTION

Field of the Invention

The present invention relates to automatic shooting techniques in image capturing apparatuses.

Description of the Related Art

Lifelogging cameras, which periodically take continuous shots without requiring shooting instructions from a user, are known (Japanese Patent Laid-Open No. 2016-536868). A lifelogging camera is used while affixed to the user's body with a strap or the like, and records scenes from the user's daily life as images, at set intervals of time. A lifelogging camera does not take shots at times specified by the user pressing a shutter button or the like. Rather, the camera automatically takes shots every set interval of time, which makes it possible to capture images of unanticipated moments that one would normally not shoot.

Japanese Patent No. 05453953 discloses a technique, applied in an image capturing apparatus configured to be capable of changing the capturing direction, in which an object is automatically searched out and shot. Even in automatic shooting, composing the shot on the basis of a detected object makes it possible to improve the chance of capturing an image the user will like.

When shooting images for the purpose of lifelogging, images of little interest to the user may be recorded as well. Automatically panning and tilting the camera to search out surrounding objects and take a shot at an angle of view that includes the detected objects can improve the chances of recording images the user will like.

However, there are also situations where an object automatically searched out and detected by the camera is not the object best suited to being shot. For example, when searching for objects, the camera may not be able to detect a person not looking at the camera as an object of importance, and that person may be excluded from the shot as a result. Furthermore, when zooming in on an object using an optical zoom mechanism, the camera may be unable to find other objects that have approached. In other words, there are limits to processing through which a camera automatically searches out objects. This leads to a problem in that a different object than that intended by the user will be captured.

SUMMARY OF THE INVENTION

Having been achieved in light of the above-described issue, the present invention makes it possible to automatically search for an object in a manner that reflects a user's intentions during an automatic object search.

According to a first aspect of the present invention, there is provided an image capturing apparatus comprising: an image capturing device configured to capture an object image; at least one processor or circuit configured to function as a determining unit configured to determine an area to search for an object in the image data captured by the image capturing device; a zoom unit configured to change the shooting angle of view of the image capturing unit; and a control unit configured to carry out control so that the zoom unit changes the shooting angle of view of the image capturing device to a wide-angle side when the determining unit determines the area to search for the object.

According to a second aspect of the present invention, there is provided a method for controlling an image capturing apparatus, the image capturing apparatus including an image capturing device that captures an object image, and the method comprising: determining an area to search for an object in the image data captured by the image capturing device; changing the shooting angle of view of the image capturing device; and carrying out control so that in the step of changing, the shooting angle of view of the image capturing device is changed to a wide-angle side when the area to search for the object is determined in the step of determining.

According to a third aspect of the present invention, there is provided a non-transitory computer-readable storage medium storing a program for causing a computer to execute the steps of a method for controlling an image capturing apparatus, the image capturing apparatus including an image capturing device that captures an object image, and the method comprising: determining an area to search for an object in the image data captured by the image capturing device; changing the shooting angle of view of the image capturing device; and carrying out control so that in the step of changing, the shooting angle of view of the image capturing device is changed to a wide-angle side when the area to search for the object is determined in the step of determining.

Further features of the present invention will become apparent from the following description of exemplary embodiments with reference to the attached drawings.

BRIEF DESCRIPTION OF THE DRAWINGS

FIGS. 10A to 10E are diagrams illustrating area division within a shot image.

DESCRIPTION OF THE EMBODIMENTS

An embodiment of the present invention will be described in detail hereinafter with reference to the appended drawings.

Figure 1A:
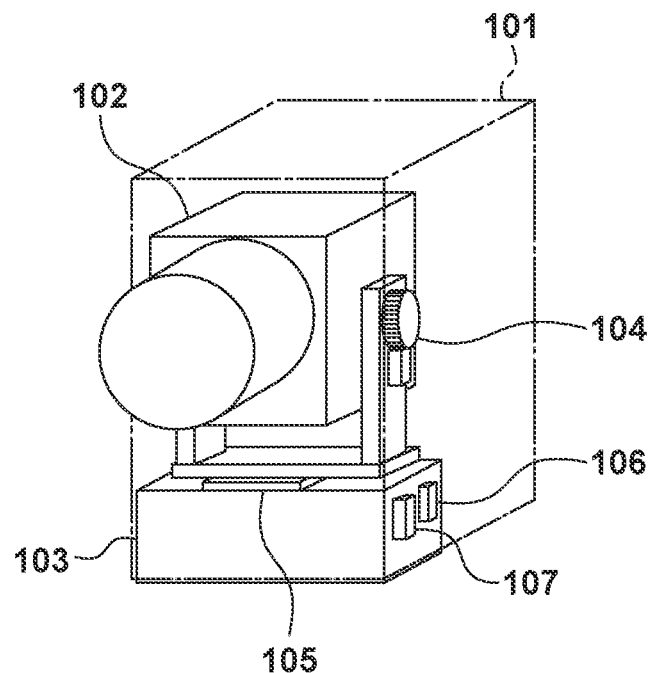
FIGS. 1A and 1B are diagrams schematically illustrating the outside appearance of a camera as an embodiment of an image capturing apparatus according to the present invention.
Figure 1B:
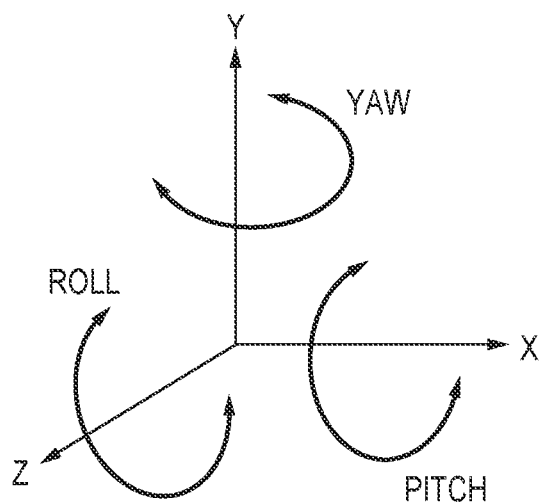

Camera Configuration FIGS. 1A and 1B are diagrams schematically illustrating the outside appearance of a camera as an embodiment of an image capturing apparatus according to the present invention. A camera 101 illustrated in FIG. 1A is provided with a power switch, operating members capable of making camera operations, and the like. A lens barrel 102, which includes a shooting lens group, an image sensor, and the like serving as an optical imaging system for capturing an object image in an integrated manner, is attached to an anchoring part 103 of the camera 101 so as to be capable of moving. Specifically, the lens barrel 102 is attached to the anchoring part 103 through a tilt rotation unit 104 and a pan rotation unit 105, which are mechanisms capable of rotational driving relative to the anchoring part 103.

The tilt rotation unit 104 includes a motor driving mechanism capable of rotationally driving the lens barrel 102 in a pitch direction, which is indicated in FIG. 1B. The pan rotation unit 105 includes a motor driving mechanism capable of rotationally driving the lens barrel 102 in a yaw direction, which is also illustrated in FIG. 1B. In other words, the camera 101 has a mechanism that rotationally drives the lens barrel 102 in two axial directions. Each axis indicated in FIG. 1B is defined with respect to the position of the anchoring part 103. An angular velocity meter 106 and an accelerometer 107 are disposed in the anchoring part 103 of the camera 101. The camera 101 detects vibrations on the basis of output signals from the angular velocity meter 106, the accelerometer 107, and the like, and can correct shake, tilting, and the like in the lens barrel 102 by rotationally driving the tilt rotation unit 104 and the pan rotation unit 105. The angular velocity meter 106, the accelerometer 107, and the like also detect movement in the camera on the basis of measurement results obtained in a set period.

Figure 2:
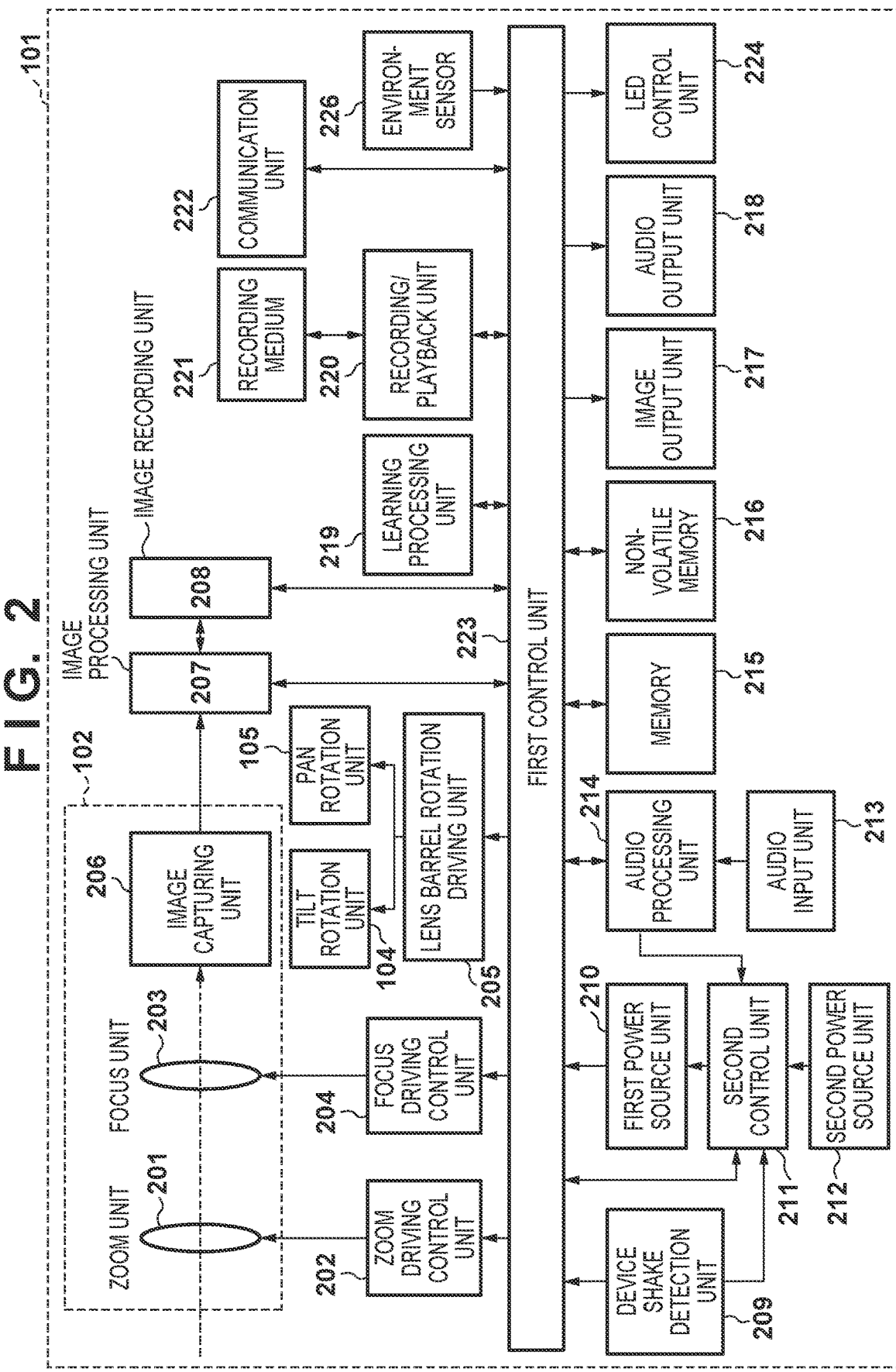
FIG. 2 is a block diagram illustrating the overall configuration of the camera according to the embodiment.

FIG. 2 is a block diagram illustrating the overall configuration of the camera 101 according to the present embodiment. In FIG. 2, a first control unit 223 includes a CPU (an MPU), memory (DRAM, SRAM), and the like, for example. The first control unit 223 controls the respective blocks of the camera 101, controls the transfer of data among the blocks, and the like by executing various types of processing in accordance with programs stored in non-volatile memory (EEPROM) 216. The non-volatile memory 216 is electrically erasable/recordable memory which stores operational constants, programs, and the like for the first control unit 223, as mentioned above.

In FIG. 2, a zoom unit 201 includes a zoom lens for carrying out magnification (enlarging and reducing the object image that is formed). A zoom driving control unit 202 controls the driving of the zoom unit 201, and detects the focal length at that time. A focus unit 203 includes a focus lens that adjusts the focus. A focus driving control unit 204 controls the driving of the focus unit 203. An image capturing unit 206 includes an image sensor. The image capturing unit 206 receives incident light through each lens group, and outputs information of a charge produced by the light amount to an image processing unit 207 as an analog image signal. Note that the zoom unit 201, the focus unit 203, and the image capturing unit 206 are disposed within the lens barrel 102.

The image processing unit 207 applies image processing such as distortion correction, white balance adjustment, color interpolation, and the like to digital image data obtained by A/D-converting the analog image signal, and outputs the processed digital image data. The digital image data output from the image processing unit 207 is converted into a format for recording, such as JPEG, by an image recording unit 208, and is then stored in memory 215, sent to an image output unit 217 (described later), or the like.

A lens barrel rotation driving unit 205 causes the lens barrel 102 to rotate in the tilt direction and the pan direction by driving the tilt rotation unit 104 and the pan rotation unit 105. A device shake detection unit 209 includes the angular velocity meter (a gyrosensor) 106, which detects the angular velocity of the camera 101 in three axial directions, the accelerometer 107, which detects the acceleration of the camera 101 in three axial directions, and the like. The rotation angle, shift amount, and the like of the device are calculated on the basis of signals detected by these sensors.

An audio input unit 213 obtains signals of audio from the surroundings of the camera 101 through a microphone provided in the camera 101, converts the audio into a digital audio signal, and sends the signal to an audio processing unit 214. The audio processing unit 214 carries out processing pertaining to audio, such as optimization, on the input digital audio signal. The audio signal processed by the audio processing unit 214 is sent to the memory 215 by the first control unit 223. The memory 215 temporarily stores the image signals and audio signals obtained from the image processing unit 207 and the audio processing unit 214.

The image processing unit 207 and the audio processing unit 214 read out the image signal, the audio signal, and the like temporarily stored in the memory 215, and encode the image signal and audio signal to generate a compressed image signal and a compressed audio signal. The first control unit 223 sends the compressed image signal and the compressed audio signal to a recording/playback unit 220.

The recording/playback unit 220 records the compressed image signal and the compressed audio signal generated by the image processing unit 207 and the audio processing unit 214, other control data pertaining to shooting, and the like in a recording medium 221. If the audio signal is not to be compressed and encoded, the first control unit 223 sends the audio signal generated by the audio processing unit 214 and the compressed image signal generated by the image processing unit 207 to the recording/playback unit 220 and causes those signals to be recorded into the recording medium 221.

The recording medium 221 may be a recording medium built into the camera 101 or a removable recording medium, and is capable of recording various types of data, such as compressed image signals, compressed audio signals, and audio signals generated by the camera 101. A medium having a larger capacity than the non-volatile memory 216 is typically used for the recording medium 221. For example, the recording medium 221 can be any type of recording medium, such as a hard disk, an optical disk, a magneto-optical disk, a CD-R, a DVD-R, magnetic tape, non-volatile semiconductor memory, or flash memory.

The recording/playback unit 220 reads out (or plays back) compressed image signals, compressed audio signals, audio signals, various types of data, programs, and the like recorded in the recording medium 221. The first control unit 223 then sends the read-out compressed image signals and compressed audio signals to the image processing unit 207 and the audio processing unit 214. The image processing unit 207 and the audio processing unit 214 store the compressed image signals and compressed audio signals in the memory 215 temporarily, decode the signals through a predetermined procedure, and send the decoded signals to the image output unit 217.

The audio input unit 213 is provided with a plurality of microphones. The audio processing unit 214 can detect the direction of a sound relative to a plane on which the plurality of microphones are arranged, and is thus used to search out objects, shoot images automatically, and so on, which will be described later. Furthermore, the audio processing unit 214 detects specific voice commands. The configuration may be such that the user can register a specific voice in the camera as a voice command, in addition to several commands which are registered in advance. The audio processing unit 214 also recognizes audio scenes. In the audio scene recognition, a network trained in advance through machine learning on the basis of large amounts of audio data is used to determine an audio scene. For example, a network for detecting specific scenes, such as an audience cheering, the sound of applause, speaking, and so on is set in the audio processing unit 214, and this is used to detect specific audio scenes, specific voice commands, and so on. Upon detecting a specific audio scene or a specific voice command, the audio processing unit 214 outputs a detection trigger signal to the first control unit 223, a second control unit 211, or the like.

In addition to the first control unit 223, which controls the main system of the camera 101 as a whole, the camera 101 is provided with the second control unit 211, which controls the power supply of the first control unit 223. A first power source unit 210 and a second power source unit 212 supply power for operation to the first control unit 223 and the second control unit 211, respectively. Power is supplied first to both the first control unit 223 and the second control unit 211 in response to a power button provided in the camera 101 being pressed. However, as will be described later, the first control unit 223 can itself carry out control for turning off the supply of power to the first power source unit 210. The second control unit 211 operates even while the first control unit 223 is not operating, and takes information from the device shake detection unit 209, the audio processing unit 214, and the like as inputs. The second control unit 211 determines whether or not to start up the first control unit 223 on the basis of various types of input information, and instructs the first power source unit 210 to supply power to the first control unit 223 when it is determined that the first control unit 223 is to be started up.

An audio output unit 218 outputs a pre-set audio pattern from a speaker built into the camera 101 during shooting and the like, for example. An LED control unit 224 causes an LED provided in the camera 101 to light up on the basis of a pre-set lighting pattern or flashing pattern during shooting and the like, for example. The image output unit 217 is constituted by image output terminals, for example, and outputs image signals for causing images to be displayed in a connected external display or the like. The audio output unit 218 and the image output unit 217 may be a single integrated terminal, e.g., a High-Definition Multimedia Interface (HDMI; registered trademark) terminal.

A communication unit 222 is a part for communication between the camera 101 and an external device, and sends and receives data such as audio signals, image signals, compressed audio signals, and compressed image signals, for example. The communication unit 222 also receives commands for starting and stopping shooting, control signals pertaining to shooting, such as pan, tilt, and zoom driving, and the like, and drives the camera 101 on the basis of instructions from the external device. The communication unit 222 also sends and receives information, such as various parameters pertaining to learning processed by a learning processing unit 219 (described later), between the camera 101 and the external device. The communication unit 222 includes an infrared communication module, a Bluetooth (registered trademark) communication module, a wireless LAN communication module, a wireless communication module such as Wireless USB (registered trademark) or a GPS receiver, or the like.

An environment sensor 226 detects the state of the surrounding environment of the camera 101 at a predetermined cycle. The environment sensor 226 includes a temperature sensor that detects the surrounding temperature of the camera 101, an atmospheric pressure sensor that detects changes in the atmospheric pressure around the camera 101, and an illumination sensor that detects the surrounding brightness of the camera 101. The environment sensor 226 further includes a humidity sensor that detects the humidity around the camera 101, a UV sensor that detects the amount of ultraviolet light around the camera 101, and the like. In addition to the detected temperature information, atmospheric pressure information, brightness information, humidity information, and UV information, a temperature change amount, atmospheric pressure change amount, brightness change amount, humidity change amount, ultraviolet light change amount, and the like, calculated from the various instances of detected information as rates of change over a predetermined period of time, are used in determinations for automatic shooting and the like, which will be described later.

Figure 3:
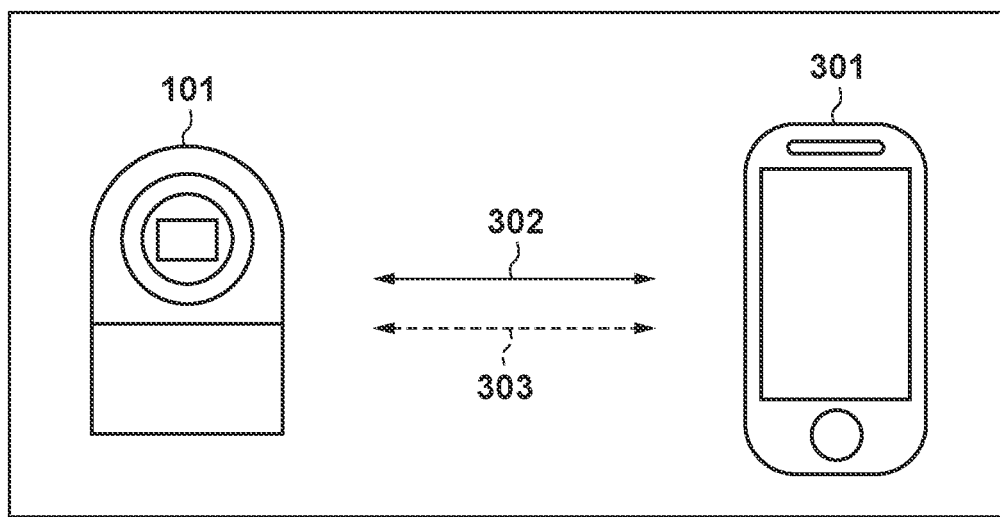
FIG. 3 is a diagram illustrating an example of the configuration of a wireless communication system between the camera and an external device.

Communication with External Device FIG. 3 is a diagram illustrating an example of the configuration of a wireless communication system between the camera 101 and an external device 301. The camera 101 is a digital camera having a shooting function, and the external device 301 is a smart device including a Bluetooth communication module and a wireless LAN communication module.

The camera 101 and the external device 301 are capable of communicating over first communication 302, which uses wireless LAN based on the IEEE 802.11 specification series, for example, and second communication 303, which provides a master/slave relationship between control stations and subsidiary stations, such as Bluetooth Low Energy ("BLE" hereinafter). Note that wireless LAN and BLE are merely examples of communication methods. Other communication methods may be used as long as each communication device has two or more communication functions, with one of the communication functions for communication within the relationship between the control station and subsidiary stations capable of controlling the other communication function, for example. However, it is assumed that the first communication 302, e.g., wireless LAN, is capable of faster communication than the second communication 303, e.g., BLE, and that the second communication 303 consumes less power, has a shorter communication range, or both, compared to the first communication 302.

Figure 4:
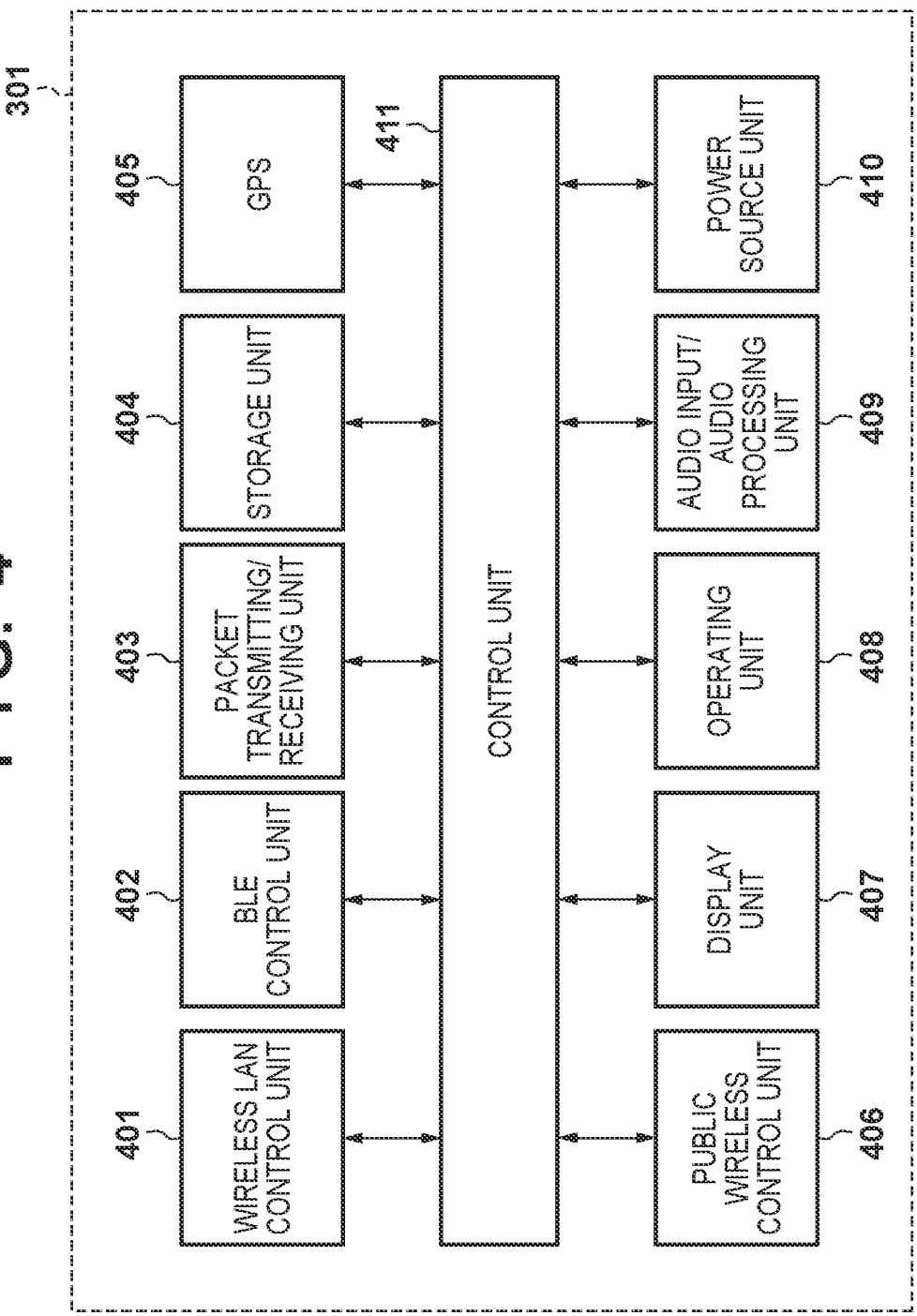
FIG. 4 is a diagram illustrating the configuration of the external device.

The configuration of the external device 301 will be described using FIG. 4. The external device 301 includes a wireless LAN control unit 401 for the wireless LAN and a BLE control unit 402 for the BLE, as well as a public wireless control unit 406 for public wireless line communication, for example. The external device 301 further includes a packet transmitting/receiving unit 403. The wireless LAN control unit 401 carries out RF control for the wireless LAN, communication processing, driver processing for carrying out various types of control for wireless LAN communication based on the IEEE 802.11 specification series, protocol processing pertaining to communication over the wireless LAN, and the like. The BLE control unit 402 carries out RF control for BLE, communication processing, driver processing for carrying out various types of control for BLE communication, protocol processing pertaining to communication over BLE, and the like. The public wireless control unit 406 carries out RF control for public wireless line communication, communication processing, driver processing for carrying out various types of control for public wireless line communication, protocol processing pertaining to public wireless line communication, and the like. The public wireless line communication is based on a standard such as International Multimedia Telecommunications (IMT), Long Term Evolution (LTE), or the like. The packet transmitting/receiving unit 403 carries out processing for executing at least one of the transmission and reception of packets pertaining to wireless LAN, BLE, and public wireless line communication. Although the present embodiment describes the external device 301 as transmitting packets, receiving packets, or both in the communication, a communication format aside from packet exchange, such as line exchange, may be used instead.

The external device 301 further includes a control unit 411, a storage unit 404, a GPS reception unit 405, a display unit 407, an operating unit 408, an audio input/audio processing unit 409, and a power source unit 410, for example. The control unit 411 controls the external device 301 as a whole by executing control programs stored in the storage unit 404, for example. The storage unit 404 stores the control programs executed by the control unit 411, as well as various information such as parameters necessary for communication, for example. Various operations (described later) are realized by the control unit 411 executing the control programs stored in the storage unit 404.

The power source unit 410 supplies power to the external device 301. The display unit 407 has functionality enabling the output of visually-recognizable information, such as an LCD or LEDs, or the output of audio, such as a speaker or the like, and displays various types of information. The operating unit 408 includes buttons and the like for accepting operations of the external device 301 made by a user, for example. The display unit 407 and the operating unit 408 may be configured as an integrated member, as with a touch panel, for example.

The audio input/audio processing unit 409 is, for example, a generic microphone built into the external device 301, which acquires the user's voice. The unit may be configured to recognize operational commands from the user through voice recognition processing. Furthermore, using a dedicated application in the external device 301, voice commands issued by the user can be acquired and then registered as specific voice commands to be recognized by the audio processing unit 214 of the camera 101, through the first communication 302 that uses wireless LAN.

The GPS (Global Positioning System) reception unit 405 estimates the current position (longitude/latitude information) of the external device 301 by receiving GPS signals issued from satellites and analyzing the GPS signals. The current position of the external device 301 may instead be estimated using a Wi-Fi Positioning System (WPS) or the like, on the basis of information of wireless networks present in the surrounding area. Movement information can be communicated to the camera 101 through the BLE control unit 402 when the current acquired GPS position information is located within a pre-set position range (within a range corresponding to a predetermined radius centered on the detection position), when the position in the GPS position information has changed by no less than a predetermined amount, and so on. The movement information can be used as a parameter for automatic shooting, automatic editing, and so on, which will be described later.

As described above, the camera 101 and the external device 301 exchange data through communication using the wireless LAN control unit 401 and the BLE control unit 402. For example, data such as audio signals, image signals, compressed audio signals, and compressed image signals are transmitted and received. Shooting instructions and the like, voice command registration data, predetermined position detection notifications based on GPS position information, location movement notifications, and the like are also transmitted from the external device 301 to the camera 101. Learning data, which is used by a dedicated application in the external device 301, is also transmitted and received.

Figure 5:
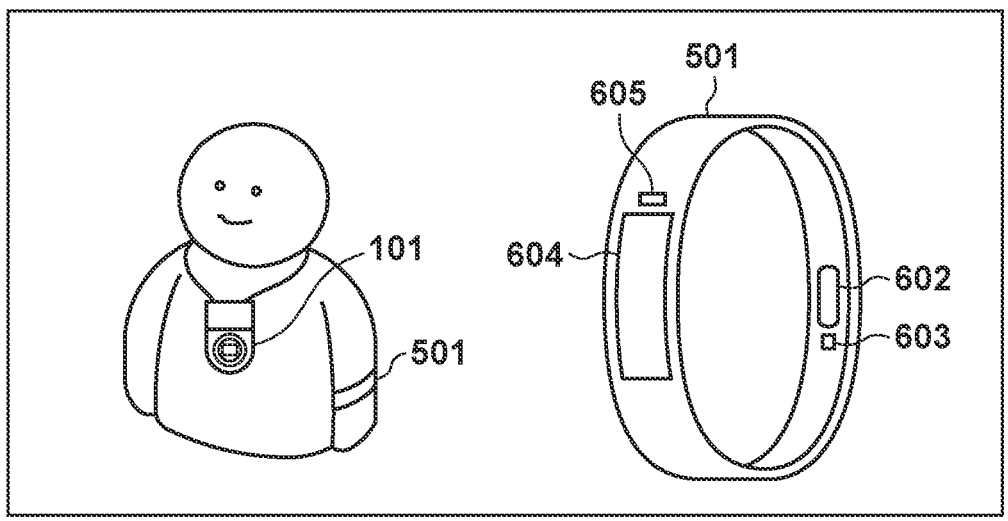
FIG. 5 is a diagram illustrating the configurations of the camera and the external device.

Configurations of Accessories FIG. 5 is a diagram illustrating an example of the configuration of an external device 501 capable of communicating with the camera 101. The camera 101 is a digital camera having a shooting function, whereas the external device 501 is a wearable device, including various sensing units, which is capable of communicating with the camera 101 through the Bluetooth communication module, for example.

The external device 501 is configured to be capable of being worn on a user's arm or the like, for example, and includes sensors that detect the user's biological information, such as his or her pulse, heartbeat, and blood flow, at a predetermined cycle, an accelerometer capable of detecting the user's activity state, and the like.

A biological information detection unit 602 includes, for example, a pulse sensor that detects the user's pulse, a heartbeat sensor that detects the user's heartbeat, a blood flow sensor that detects the user's blood flow, a sensor that detects changes in potential using a conductive polymer that makes contact with the skin, and so on. The descriptions given in the present embodiment assume that a heartbeat sensor is used as the biological information detection unit 602. The heartbeat sensor detects the user's heartbeat by irradiating the skin with infrared light using an LED or the like, using a light-receiving sensor to detect the infrared light that has passed through biological tissues, and carrying out signal processing, for example. The biological information detection unit 602 outputs the detected biological information to a control unit 607 (see FIG. 6) as a signal.

An oscillation detection unit 603, which detects the user's activity state, includes an accelerometer, a gyrosensor, or the like, for example, and can detect motion, such as whether the user is moving, swinging his or her arms, or the like, on the basis of acceleration information. An operating unit 605, which accepts operations of the external device 501 made by the user, and a display unit 604, which is an LCD or LED monitor or the like that outputs information in a visually-recognizable manner, are also provided.

Figure 6:
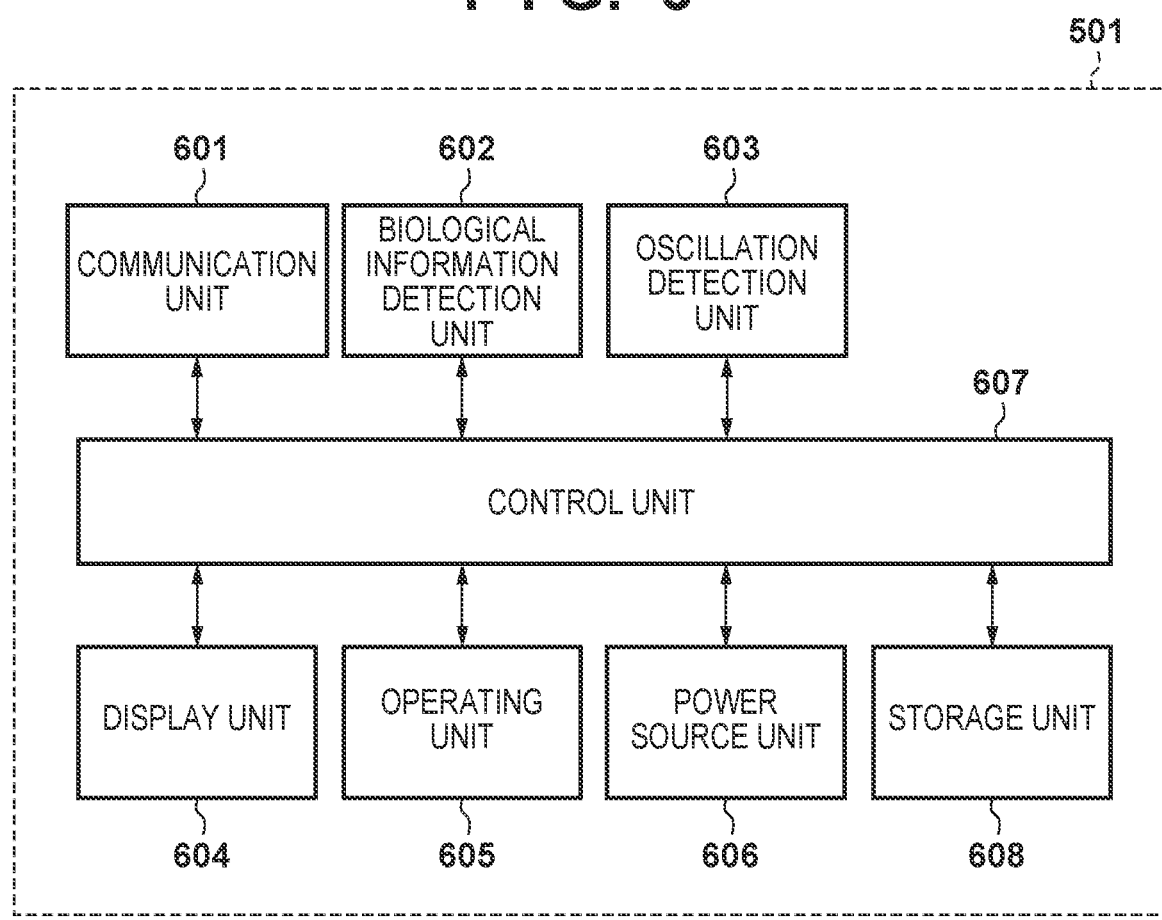
FIG. 6 is a diagram illustrating the configuration of the external device.

FIG. 6 is a diagram illustrating the configuration the external device 501. As described above, the external device 501 includes, for example, the control unit 607, a communication unit 601, the biological information detection unit 602, the oscillation detection unit 603, the display unit 604, the operating unit 605, a power source unit 606, and a storage unit 608.

The control unit 607 controls the external device 501 as a whole by executing control programs stored in the storage unit 608, for example. The storage unit 608 stores the control programs executed by the control unit 607, as well as various information such as parameters necessary for communication, for example. Various operations (described later) are realized by the control unit 607 executing the control programs stored in the storage unit 608, for example.

The power source unit 606 supplies power to the external device 501. The display unit 604 has an output unit for outputting visually-recognizable information, such as an LCD or LEDs, or for outputting audio, such as a speaker or the like, and displays various types of information. The operating unit 605 includes buttons and the like for accepting operations of the external device 501 made by a user, for example. The display unit 604 and the operating unit 605 may be configured as an integrated member, as with a touch panel, for example. The operating unit 605 may use, for example, a generic microphone built into the external device 501 to acquire the user's voice. The unit may be configured to recognize operational commands from the user through voice recognition processing.

The various types of detection information, acquired by the biological information detection unit 602 and the oscillation detection unit 603 and then processed by the control unit 607, are sent to the camera 101 through the communication unit 601. For example, the detection information can be transmitted to the camera 101 upon a change in the user's heartbeat being detected, or the detection information can be transmitted when there is a change in the user's movement state, such as walking, running, or standing. Furthermore, the detection information can be transmitted upon detecting a pre-set arm swinging motion, or can be transmitted upon detecting movement over a pre-set distance.

Camera Operation Sequence

Figure 7:
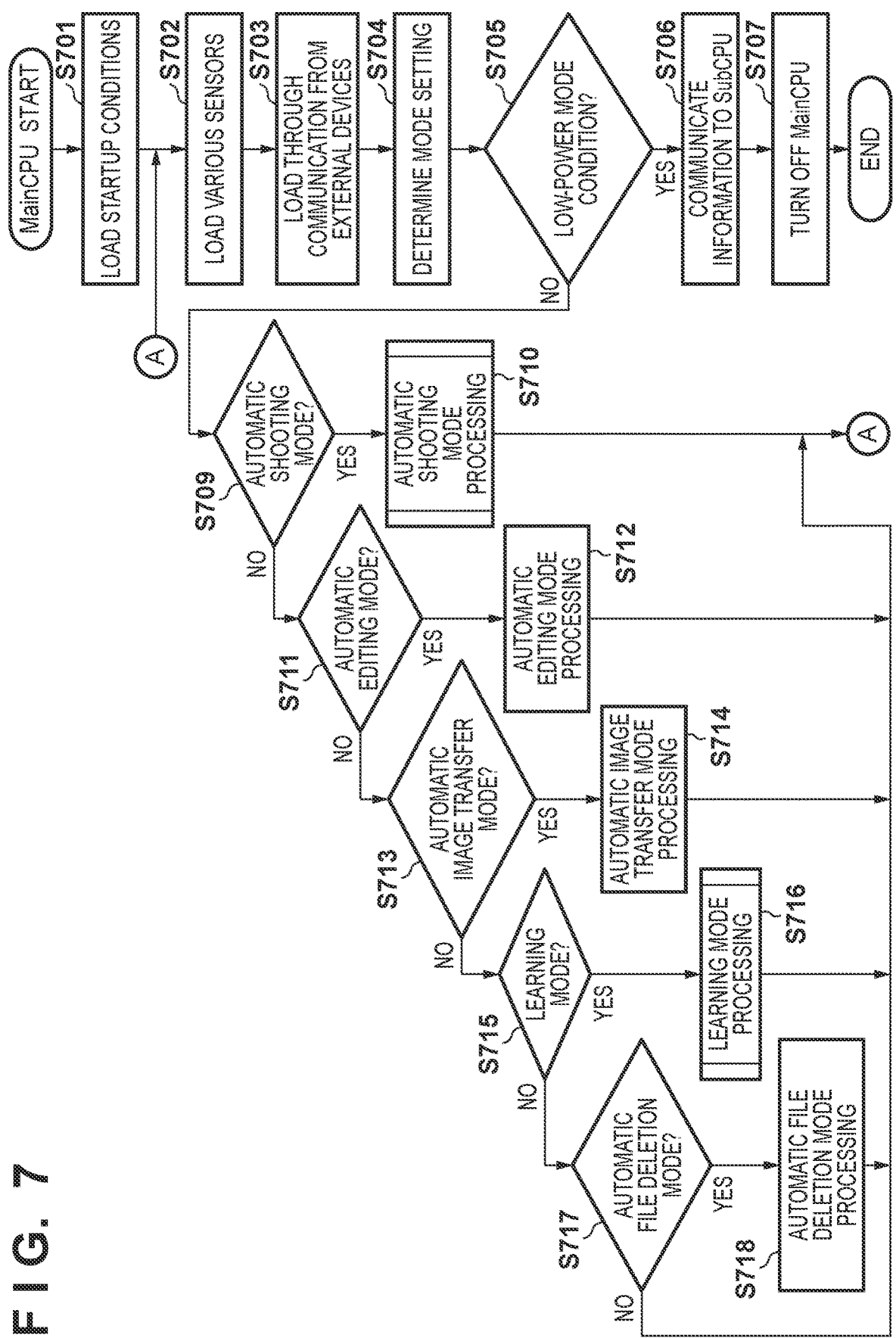
FIG. 7 is a flowchart illustrating operations carried out by a first control unit.

FIG. 7 is a flowchart illustrating an example of operations carried out by the first control unit 223 of the camera 101 according to the present embodiment.

When the user operates the power button provided in the camera 101, power is supplied from the first power source unit 210 to the first control unit 223 and the respective blocks in the camera 101. Likewise, power is supplied to the second control unit 211 from the second power source unit 212. The operations of the second control unit 211 will be described in detail later using the flowchart in FIG. 8.

The processing of FIG. 7 starts when power is supplied. In step S701, startup conditions are loaded. In the present embodiment, the following three conditions are provided for starting the supply of power.
(1) The supply of power is started in response to the power button being pressed manually.
(2) The supply of power is started in response to a startup instruction being sent from an external device (e.g., the external device 301) over external communication (e.g., BLE communication).
(3) The supply of power is started in response to an instruction from the second control unit 211.

Here, when (3) the supply of power is started in response to an instruction from the second control unit 211, startup conditions computed within the second control unit 211 are loaded. This will be described in detail later using FIG. 8. The startup conditions loaded here are used as one parameter element during object searches, automatic shooting, and the like, and these will be described later as well. The sequence moves to step S702 once the startup conditions have been loaded.

In step S702, detection signals from the various sensors are loaded. One of the sensor signals loaded here is a signal from a sensor that detects vibration, such as the accelerometer or the gyrosensor in the device shake detection unit 209. There are also signals indicating the rotational positions of the tilt rotation unit 104 and the pan rotation unit 105. Furthermore, there are also the audio signal detected by the audio processing unit 214, a detection trigger signal for specific voice recognition, a sound direction detection signal, and an environment information detection signal detected by the environment sensor 226. Once the detection signals from the various sensors have been loaded in step S702, the sequence moves to step S703.

In step S703, it is detected whether a communication instruction has been transmitted from the external device. If a communication instruction has been transmitted, communication is carried out with the external device. This communication includes, for example, remote operations from the external device 301 through wireless LAN or BLE, exchanging audio signals, image signals, compressed audio signals, compressed image signals, and the like, operation instructions for shooting and the like from the external device 301, transmitting voice command registration data, exchanging predetermined position detection notifications and location movement notifications based on GPS position information, learning data, and the like. The communication further includes loading information from the external device 501 over BLE in the event that the user's biological information, such as activity information, arm action information, and heartbeat, has been updated. Although the above-described environment sensor 226 may be provided in the camera 101, it may be provided in the external device 301 or the external device 501 as well. In such a case, the environment information is loaded over BLE in step S703. Once the information has been loaded through communication from the external devices in step S703, the sequence moves to step S704.

In step S704, a mode setting determination is made, after which the sequence moves to step S705. In step S705, it is determined whether or not an operating mode is set to a low-power mode in step S704. If the mode is neither an "automatic shooting mode", an "automatic editing mode", an "automatic image transfer mode", a "learning mode", nor an "automatic file deletion mode" (described later), the mode is determined to be the low-power mode. If the mode is determined to be the low-power mode in step S705, the sequence moves to step S706.

In step S706, various parameters (oscillation detection determination parameters, sound detection parameters, and elapsed time detection parameters) pertaining to startup factors determined in the second control unit 211 are communicated to the second control unit 211 (which is a sub CPU). The values of the various parameters change through learning in a learning process (described later). Once the processing in step S706 ends, the sequence moves to step S707, where the first control unit 223 (which is a main CPU) is turned off, and the processing ends.

If the mode is determined to not be the low-power mode in step S705, it is determined in step S709 whether or not the mode setting in step S704 is the automatic shooting mode. The mode setting determination process carried out in step S704 will be described next. The mode to be determined is selected from the following modes.

(1) Automatic Shooting Mode

Mode Determination Conditions

The automatic shooting mode is set when it is determined that automatic shooting is to be carried out, on the basis of information such as the various types of detection information set through learning (images, sounds, time, vibrations, locations, body changes, environmental changes), information indicating the amount of time that has passed since transitioning to the automatic shooting mode, past shooting information and the number of shots taken in the past, and the like.

Processing in the Mode

In the automatic shooting mode processing (step S710), an object is automatically searched for through pan, tilt, and zoom operations on the basis of the various types of detection information (images, sounds, time, vibrations, locations, body changes, and environmental changes). Shooting is then carried out automatically upon it being determined that a shot matching the user's preferences can be taken.

(2) Automatic Editing Mode

Mode Determination Conditions

The automatic editing mode is set when it is determined that automatic editing is to be carried out, on the basis of the amount of time that has passed since the previous automatic editing and information of images shot in the past.

Processing in the Mode

In the automatic editing mode processing (step S712), an automatic editing process is carried out to generate a highlight moving image, in which still images, moving images, and the like are selected on the basis of the learning process and collected into a single moving image according to image effects, the duration of the edited moving image, and so on, on the basis of the learning.

(3) Automatic Image Transfer Mode

Mode Determination Conditions

When the automatic image transfer mode is set in response to an instruction made using a dedicated application in the external device 301, the automatic image transfer mode is set upon it being determined that automatic transfer should be carried out, on the basis of the amount of time that has passed since the previous image transfer and information of images shot in the past.

Processing in the Mode

In the automatic image transfer mode processing (step S714), the camera 101 automatically extracts an image assumed to match the user's preferences, and automatically transfers that image to the external device 301. The extraction of the image matching the user's preferences is carried out on the basis of a score determined based on the user's preferences, which is added to each of the images (described later).

(4) Learning Mode

Mode Determination Conditions

The learning mode is set when it is determined that automatic learning should be carried out, on the basis of the amount of time that has passed since the previous learning process, information integrated with images that can be used in the learning, the number of pieces of learning data, and the like. This mode is also set when an instruction for setting the learning mode has been made through communication from the external device 301.

Processing in the Mode

In the learning mode processing (step S716), learning based on the user's preferences is carried out using a neural network, on the basis of various operation information from the external device 301 (information of images acquired from the camera, information that has been manually edited through a dedicated application, and determination value information input by the user for an image within the camera), notifications of learning information from the external device 301, and the like. Learning pertaining to detection, such as registrations for personal authentication, registering a voice, registering audio scenes, and registration for general object recognition, as well as learning conditions for the above-described low-power mode, and the like are also carried out at the same time.

(5) Automatic File Deletion Mode

Mode Determination Conditions

The automatic file deletion mode is set when it is determined that automatic file deletion should be carried out, on the basis of the amount of time that has passed since the previous automatic file deletion, the space remaining in the non-volatile memory 216 which records images, and so on.

Processing in the Mode

In the automatic file deletion mode processing (step S718), files in the non-volatile memory 216 that are to be deleted automatically are designated and deleted on the basis of tag information of each image, the date/time when the image was captured, and so on.

The processing in each of these modes will be described in detail later.

Returning to FIG. 7, if it is determined in step S705 that the mode is not the low-power mode, the sequence moves to step S709, where it is determined whether or not the mode is set to the automatic shooting mode. If the result of the determination indicates that the mode is not the automatic shooting mode, the sequence moves to step S710, where the automatic shooting mode processing is carried out. Once this processing ends, the sequence returns to step S702, where the processing is repeated. If the mode is determined not to be the automatic shooting mode in step S709, the sequence moves to step S711.

In step S711, it is determined whether or not the mode is set to the automatic editing mode. If the mode is the automatic editing mode, the sequence moves to step S712, where the automatic editing mode processing is carried out. Once this processing ends, the sequence returns to step S702, where the processing is repeated. If the mode is determined not to be the automatic editing mode in step S711, the sequence moves to step S713. Because the automatic editing mode has no direct relationship with the main subject of the present invention, detailed descriptions thereof will not be given here.

In step S713, it is determined whether or not the mode is set to the automatic image transfer mode. If the mode is the automatic image transfer mode, the sequence moves to step S714, where the automatic image transfer mode processing is carried out. Once this processing ends, the sequence returns to step S702, where the processing is repeated. If the mode is determined not to be the automatic image transfer mode in step S713, the sequence moves to step S715. Because the automatic image transfer mode has no direct relationship with the main subject of the present invention, detailed descriptions thereof will not be given here.

In step S715, it is determined whether or not the mode is set to the learning mode. If the mode is the learning mode, the sequence moves to step S716, where the learning mode processing is carried out. Once this processing ends, the sequence returns to step S702, where the processing is repeated. If it is determined in step S715 that the mode is not the learning mode, the sequence moves to step S717.

In step S717, it is determined whether or not the mode is set to the automatic file deletion mode. If the mode is the automatic file deletion mode, the sequence moves to step S718, where the automatic file deletion mode processing is carried out. Once this processing ends, the sequence returns to step S702, where the processing is repeated. If it is determined in step S717 that the mode is not the automatic file deletion mode, the sequence returns to step S702, and the processing is repeated. Because the automatic file deletion mode has no direct relationship with the main subject of the present invention, detailed descriptions thereof will not be given here.

Figure 8:
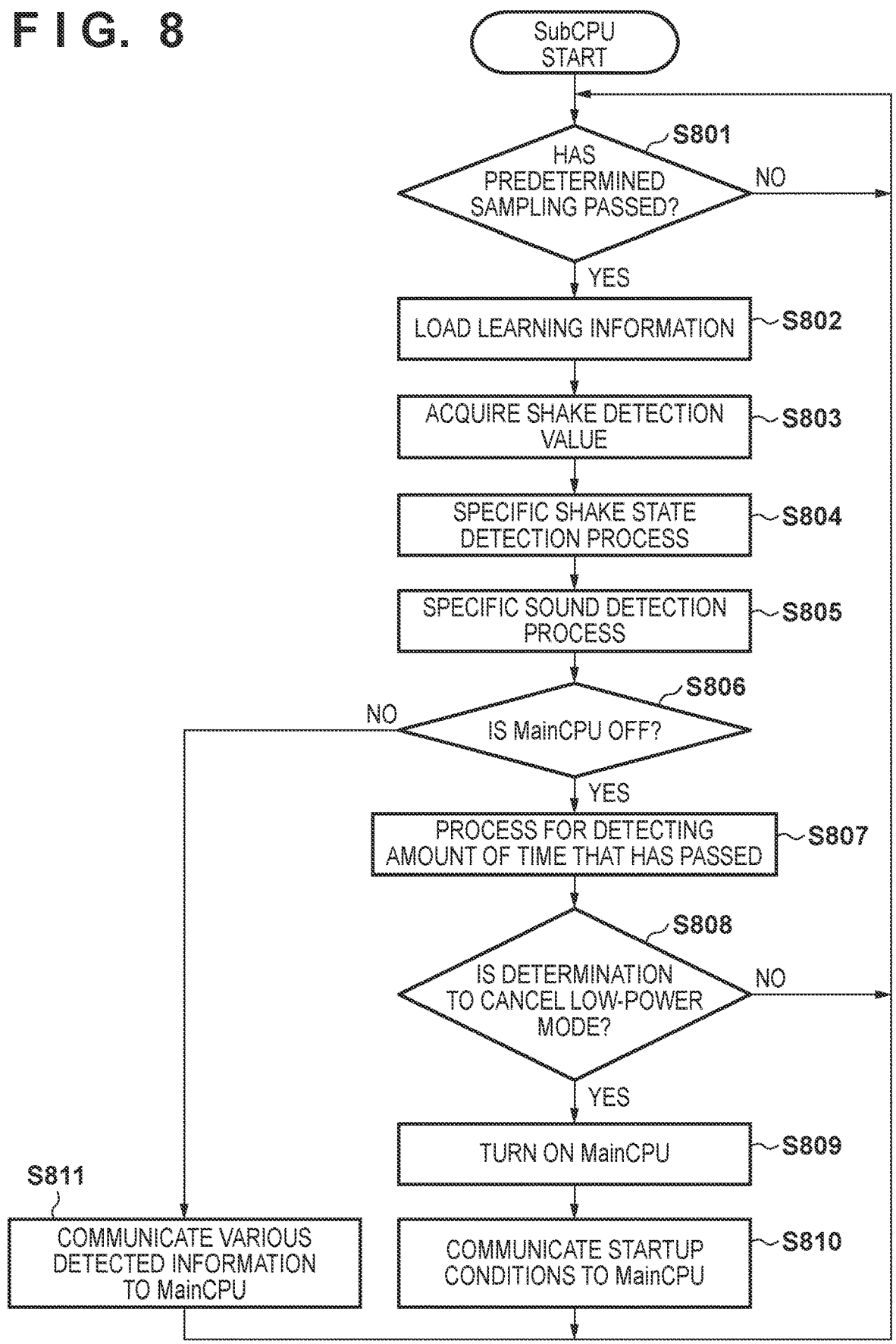
FIG. 8 is a flowchart illustrating operations carried out by a second control unit.

FIG. 8 is a flowchart illustrating an example of operations carried out by the second control unit 211 of the camera 101 according to the present embodiment.

When the user operates the power button provided in the camera 101, power is supplied from the first power source unit 210 to the first control unit 223 and the respective blocks in the camera 101. Likewise, power is supplied to the second control unit 211 from the second power source unit 212.

When power is supplied, the second control unit (sub CPU) 211 is activated, and the processing illustrated in FIG. 8 starts. In step S801, it is determined whether or not a predetermined sampling period has passed. The predetermined sampling period is set to 10 ms, for example, and thus the sequence moves to step S802 after the period of 10 ms. If it is determined that the predetermined sampling period has not passed, the second control unit 211 stands by.

In step S802, learning information is loaded. The learning information is information transferred when information is communicated to the second control unit 211 in step S706 of FIG. 7, and includes the following information, for example.
(1) Determinations of specific shake detections (used in step S804, described later)
(2) Determinations of specific sound detections (used in step S805, described later)
(3) Determinations of elapsed time (used in step S807, described later)

Once the learning information has been loaded in step S802, the sequence moves to step S803, where a shake detection value is acquired. The shake detection value is the value output by the gyrosensor, the accelerometer, or the like in the device shake detection unit 209.

Once the shake detection value has been acquired in step S803, the sequence moves to step S804, where a process for detecting a pre-set specific shake state is carried out. Here, the determination process is changed depending on the learning information loaded in step S802. Several examples will be given below.

Tap Detection

A state in which the user has struck the camera 101 with his or her fingertip, for example (a tapped state) can be detected from the value output by the accelerometer 107 attached to the camera 101. By passing the output of the three-axis accelerometer 107 through a band pass filter (BPF), which is set to a specific frequency range, at the predetermined sampling period, a signal range corresponding to a change in the acceleration caused by the tap can be extracted. The tap is then detected on the basis of whether or not the acceleration signal, which has been passed through the BPF, has exceeded a predetermined threshold ThreshA by a predetermined number of times CountA within a predetermined amount of time TimeA. CountA is set to 2 for a double tap, and to 3 for a triple tap. TimeA and ThreshA can also be changed depending on the learning information.

Shake State Detection

The shake state of the camera 101 can be detected from values output by the gyrosensor 106, the accelerometer 107, and the like, which are attached to the camera 101. High-frequency components and low-frequency components of the outputs from the gyrosensor 106, the accelerometer 107, and the like are cut using a high-pass filter (HPF) and a low-pass filter (LPF), respectively, after which the outputs are converted to absolute values. Vibrations are detected on the basis of whether or not the calculated absolute value exceeds a predetermined threshold ThreshB no less than a predetermined number of times CountB within a predetermined amount of time TimeB. This makes it possible to determine a state in which there is little shake, such as when the camera 101 is placed on a desk or the like, or a state in which there is significant shake, such as when the camera 101 is attached to the user's body as a wearable camera and the user is walking. The shake state can be detected more finely, on the basis of a shake level, by providing a plurality of conditions for the determination threshold, the determination counts, and the like. TimeB, ThreshB, and CountB can also be changed depending on the learning information.

The foregoing describes a method in which a specific shake state is detected by determining a detection value from a shake detection sensor. However, it is also possible to detect a specific shake state that has been registered in advance, using a trained neural network, on the basis of data from a shake detection sensor sampled within a predetermined amount of time, by inputting the data into a shake state determiner that uses a neural network. In this case, the learning information loaded in step S802 is weighting parameters for the neural network.

Once the specific shake state detection process has been carried out in step S804, the sequence moves to step S805, where a process for detecting a pre-set specific sound is carried out. Here, the detection determination process is changed depending on the learning information loaded in step S802. Several examples will be given below.

Specific Voice Command Detection

A specific voice command is detected. The user can register a specific voice in the camera as a voice command, in addition to several commands which are registered in advance.

Specific Audio Scene Recognition

A network trained in advance through machine learning on the basis of large amounts of audio data is used to determine an audio scene. For example, specific scenes such as an audience cheering, the sound of applause, speaking, and so on are detected. The detected scenes change based on learning.

Sound Level Determination

A sound level is detected by determining whether the volume of an audio level exceeds a predetermined volume within a predetermined amount of time. The predetermined amount of time, the predetermined magnitude, and the like change based on learning.

Sound Direction Determination

The direction of the sound is detected, for sound of a predetermined volume, using a plurality of microphones arranged on a plane.

The above-described determination processing is carried out within the audio processing unit 214, and whether a specific sound has been detected is determined in step S805 on the basis of various settings learned in advance.

When the process for detecting specific sound is carried out in step S805, the sequence moves to step S806, where it is determined whether or not the first control unit 223 is powered off. If the first control unit 223 (the main CPU) is off, the sequence moves to step S807, where a process for detecting the passage of a pre-set amount of time is carried out. Here, the detection determination process is changed depending on the learning information loaded in step S802. The learning information is information transferred when information is communicated to the second control unit 211 in step S706 of FIG. 7. The amount of time that has passed since the first control unit 223 transitioned from on to off is measured. If the amount of time that has passed is greater than or equal to a predetermined amount of time TimeC, it is determined that the time has passed, whereas if the amount of time that has passed is less than TimeC, it is determined that the time has not passed. TimeC is a parameter that changes depending on the learning information.

Once the process for detecting the amount of time that has passed is carried out in step S807, the sequence moves to step S808, where it is determined whether or not conditions for canceling the low-power mode have been met. Whether to cancel the low-power mode is determined on the basis of the following conditions.

(1) A specific type of shaking has been detected.
(2) A specific sound has been detected.
(3) A predetermined amount of time has passed.

With respect to (1), whether or not the specific type of shaking has been detected is determined through the specific shake state detection process carried out in step S804. With respect to (2), whether or not the specific sound has been detected is determined through the specific sound detection process carried out in step S805. With respect to (3), whether or not the predetermined amount of time has passed is determined through the process for detecting the amount of time that has passed, carried out in step S807. It is determined that the low-power mode is to be canceled when at least one of (1) to (3) is met.

Once it is determined that the low-power mode is to be canceled in step S808, the sequence moves to step S809, where the first control unit 223 is powered on. Then, in step S810, the conditions for determining to cancel the low-power mode (shaking, sound, or the amount of time) are communicated to the first control unit 223. The sequence then returns to step S801, and the processing loops. If none of the conditions for canceling the low-power mode are met in step S808, and it is determined that the low-power mode is not to be canceled, the sequence returns to step S801 and the processing loops.

On the other hand, if it is determined in step S806 that the first control unit 223 is on, the sequence moves to step S811, where the information acquired from steps S803 to S805 is communicated to the first control unit 223. The sequence then returns to step S801, and the processing loops.

In the present embodiment, the configuration is such that even when the first control unit 223 is on, the second control unit 211 detects shaking, specific sounds, and so on and communicates the results of the detections to the first control unit 223. However, the configuration may be such that when the first control unit 223 is on, the processing of steps S803 to S805 is not carried out, and the detection of shaking, specific sounds, and so on is carried out through processing within the first control unit 223 (step S702 in FIG. 7).

As described above, the conditions for transitioning to the low-power mode, the conditions for canceling the low-power mode, and the like are learned on the basis of user operations, through the processing in steps S704 to S707 in FIG. 7, the processing illustrated in FIG. 8, and the like. This makes it possible to carry out camera operations that match the way the user who owns the camera 101 uses the camera. A method for this learning will be described later.

Although the foregoing describes, in detail, a method for canceling the low-power mode on the basis of detecting shaking, detecting sounds, or the passage of time, the low-power mode may be canceled on the basis of environment information. The environment information can be determined on the basis of whether or not the absolute amounts or change amounts in temperature, atmospheric pressure, brightness, humidity, and ultraviolet light exceed predetermined thresholds, and the thresholds can also be changed based on learning, which will be described later.

Absolute values, change amounts, and the like in the detection information, such as the detected shaking, sounds, and the passage of time, as well as each piece of environment information, may be determined on the basis of a neural network and used to determine whether to cancel the low-power mode. The determination conditions in this determination process can be changed based on learning, which will be described later.

Automatic Shooting Mode Processing

Processing carried out in the automatic shooting mode will be described using FIG. 9A. First, in step S901, the image processing unit 207 carries out image processing on the signal obtained from the image capturing unit 206, and generates an image for object detection. An object detection process, which detects a person, an object, or the like, is carried out on the generated image.

When detecting a person, the face, body, and the like of the object are detected. In a face detection process, patterns for determining a person's face are set in advance, and a part within a captured image that matches those patterns can be detected as a person's face region. A reliability level indicating the degree of certainty that the object is a face is calculated at the same time. The reliability level is calculated from, for example, the size of the face region within the image, the degree to which the region matches a face pattern, and so on. The same applies to object recognition, in which an object that matches a pre-registered pattern is recognized.

There is also a method of extracting a characteristic object using a histogram of the hue, saturation, or the like within a captured image. A distribution calculated from a histogram of the hue, saturation, or the like pertaining to the image of an object found within the shooting angle of view is divided among a plurality of sections, and processing for classifying the captured image on a section-by-section basis is executed. For example, a plurality of histograms of color components are created for the captured image and sectioned into peak-shaped distribution ranges. The captured image is classified in regions belonging to the same combination of sections, and the image region corresponding to the object is recognized. Then, by calculating an evaluation value for each image region of the recognized object, the object image region having the highest evaluation value can be determined to be a main object region. Each piece of object information can be obtained from the captured information through the above method.

In step S902, an image blur correction amount is calculated. Specifically, first, an absolute angle of the camera movement is calculated on the basis of the angular velocity and acceleration information obtained by the device shake detection unit 209. Then, an angle at which the image blur is corrected by moving the tilt rotation unit 104 and the pan rotation unit 105 in an angular direction that cancels out that absolute angle is found and taken as the image blur correction amount. Note that the calculation method used in the image blur correction amount calculation process carried out here can be changed on the basis of a learning process (described later).

In step S903, the state of the camera is determined. The current state of vibrations/movement in the camera is determined on the basis of a camera angle, camera movement amount, and the like detected on the basis of the angular velocity information, acceleration information, GPS position information, and so on. For example, if the camera 101 is taking shots while mounted on a vehicle, object information such as the surrounding scenery will change significantly depending on the distance by which the vehicle moves. As such, it is determined whether or not the camera is in a "vehicle movement state", in which the camera is mounted on a vehicle or the like and is moving at a high speed, and this determination is used in automatic object searches (described later). It is also determined whether or not the angle of the camera has changed significantly, to determine whether or not the camera 101 is in a "stationary shooting state", in which the camera experiences almost no oscillations. In the "stationary shooting state", it can be safely assumed that the camera 101 itself will not change positions, and thus object searches for stationary shooting can be carried out. On the other hand, when the angle of the camera changes relatively significantly, the camera is determined to be in a "handheld state", and this determination can be used to carry out object searches for handheld situations.

In step S904, an object search process is carried out. The object search is constituted by the following processing.
(1) area division
(2) calculating an importance level on an area-by-area basis
(3) determining a search target area
These processes will be described in order hereinafter.

(1) Area Division

Area division will be described using FIGS. 10A to 10E. As illustrated in FIG. 10A, the entire periphery of the camera is divided into areas, with the location of the camera serving as the center (an origin O is taken as the camera position). In the example of FIG. 10A, the division is carried out every 22.5 degrees in both the tilt direction and the pan direction. When the division is carried out as illustrated in FIG. 10A, the circumference in the horizontal direction become smaller, and the areas become smaller as well, as the angle in the tilt direction moves away from 0 degrees. As such, when the tilt angle is greater than or equal to 45 degrees as indicated in FIG. 10B, the area range in the horizontal direction is set to be greater than 22.5 degrees.

FIGS. 10C and 10D illustrate examples of regions obtained by the area division carried out within the shooting angle of view. An axis 1301 indicates the orientation of the camera 101 in an initial state, and the area division is carried out using this orientation of the reference position. 1302 indicates the angle of view area of the captured image, and FIG. 10D illustrates an example of the image captured at that time. The image is divided as indicated by reference numerals 1303 to 1318 in FIG. 10D on the basis of the area division carried out within the image from the captured angle of view.

(2) Calculating an Importance Level on an Area-by-Area Basis

An importance level, which indicates a priority order for carrying out searches, is calculated for each of the areas obtained through the above-described division, in accordance with the state of objects, state of the scene, and so on within each area. The importance level based on the state of the object is calculated on the basis of, for example, the number of people present in the area, the sizes of the people's faces, the orientations of the faces, the degree of certainty of the face detection, the expressions of the people, personal authentication results for the people, and so on. Meanwhile, the importance level based on the state of the scene is calculated on the basis of, for example, general object recognition results, scene judgment results (a blue sky, backlighting, evening scenery, and so on), the level of sounds from the direction of the area and voice recognition results, motion detection information within the area, and so on.

Figure 9A:
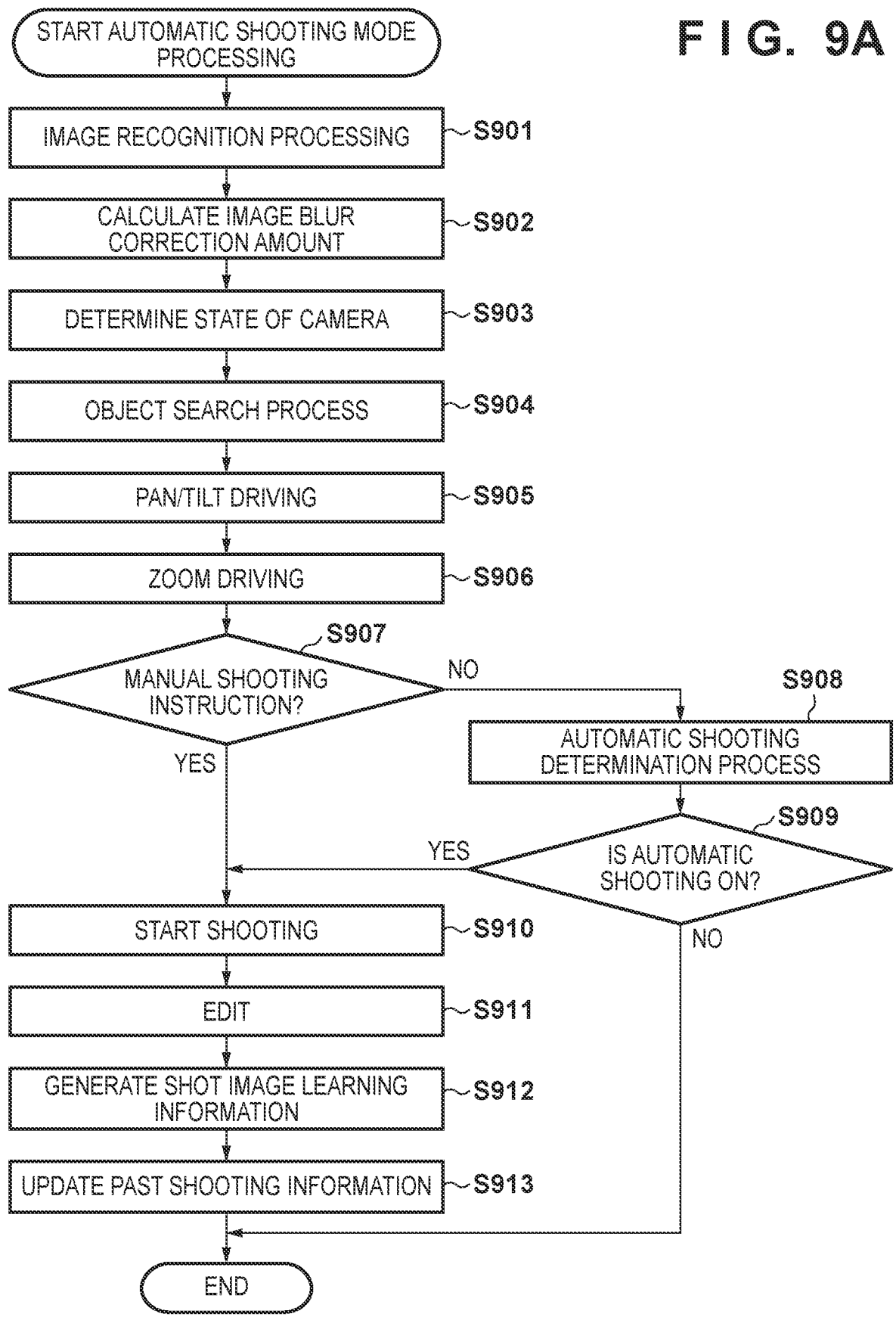
FIG. 9A is a flowchart illustrating operations carried out in shooting mode processing.

Additionally, it is also possible to have the importance level change in accordance with the vibration state when vibrations have been detected in the camera in the camera state determination in FIG. 9A (step S903). For example, if the "stationary shooting state" has been determined, it is determined that the object search is to be carried out focusing on objects having a high priority level among objects registered through facial authentication (e.g., the owner of the camera). Automatic shooting (described later) is also carried out with priority given to the camera owner's face, for example. By doing so, even if the owner of the camera usually shoots images while walking around with the camera attached to his or her body, a greater number of images including the owner can be captured by removing the camera and placing it on a desk or the like. Because faces can be searched out through panning and tilting at this time, images including the owner, group photos and the like including many faces, and so on can be captured simply by placing the camera in a suitable manner, without considering the angle of placement of the camera or the like.

Under the above-described conditions alone, if there are no changes in each of the areas, the same area will always have the highest importance level. As a result, the area that is searched will never change. In view of this, the importance level is varied in accordance with past shooting information. Specifically, the importance level may be reduced for areas continuously designated as search areas for a predetermined amount of time, reduced for a predetermined amount of time in areas where shooting is carried out in step S910 (described later), and so on.

Furthermore, when the camera is moving, such as when the camera is attached to the body of the camera's owner or mounted on a vehicle or the like, there are situations where when an object search has been carried out for the surroundings using the pan/tilt functions, an object is no longer visible at the point in time when the shot is taken. Alternatively, the object may have become too distant or too small, making the object search pointless. In view of this, the movement direction, movement speed, and the like of the camera are calculated from the angular velocity information, acceleration information, and GPS position information detected in step S903, and furthermore from motion vectors calculated for each of coordinates in the shot image. Then, on the basis thereof, it may be determined from the outset that no object is present in areas distant from the travel direction. Conversely, the search time interval may be varied in accordance with the movement speed, such as shortening the object search time interval when moving at high speeds, in order to ensure that important objects will not be missed.

Additional descriptions will be given here regarding the zoom position when finding the importance level on an area-by-area basis. The first time the importance level is calculated on an area-by-area basis, when a predetermined amount of time has passed since the importance level was calculated, and so on, the importance level is calculated on an area-by-area basis with the zoom unit 201 having been driven to the wide-angle side. This is because the first time the importance level is calculated, when a predetermined amount of time has passed since the importance level was calculated, and so on, it is not known where an important object is present, and it is therefore necessary to search over a wide range. Finding the importance level having controlled the zoom unit to move to the wide-angle side makes it possible to shorten the time required for the search. After the object target area has been determined, the object is tracked using zoom driving in step S906 (described later). While the object is being tracked, the angle of view is controlled by the zoom unit 201 to ensure the object has an appropriate size, an appropriate balance with the background, and so on. However, when the object tracking is to be canceled and an object is to be searched out again, the importance level is calculated on an area-by-area basis after driving the zoom unit to the wide-angle side.

Note that the pan rotation unit 105 includes a mechanism that enables manual positioning in addition to rotational driving by a motor, and thus the position can be set manually as well. A manual pan operation can be detected by a pulse sensor used when driving the pan rotation unit. When calculating the importance level on an area-by-area basis, if a panning operation has been made manually using this mechanism, the area designated manually is determined to be the most important area. Setting the importance level of that area to an extremely high value makes it possible to determine the search target area in a manner that reflects the user's intentions. Furthermore, if a panning operation has been made manually while an object is being tracked, quickly controlling the zoom to move to the wide-angle side and then re-calculating the importance level on an area-by-area basis makes it possible to determine the search target area in a manner that reflects the user's intentions.

At this time, the zoom control amount for moving to the wide-angle side may be varied in accordance with the manual control amount used during the manual panning operation. In other words, when a major panning operation is carried out manually, the zoom is controlled to move to the wide-angle end, and the area-by-area importance levels are deleted. On the other hand, when a minor panning operation has been carried out, the zoom is controlled to move only slightly toward the wide-angle side, and the area-by-area importance levels are saved at that time. This is useful in increasing the likelihood that the object will be captured correctly.

Additionally, with respect to tilt driving, area searching is first carried out from a horizontal position when searching for an object. In particular, when a manual panning operation has been carried out, tilt driving is carried out so that the camera is horizontal relative to the ground surface, and the object search is then carried out. The object search is then carried out again after returning to the tilt direction that was being used before the manual panning operation. This makes it possible to find an important object more quickly.

Figure 9B:
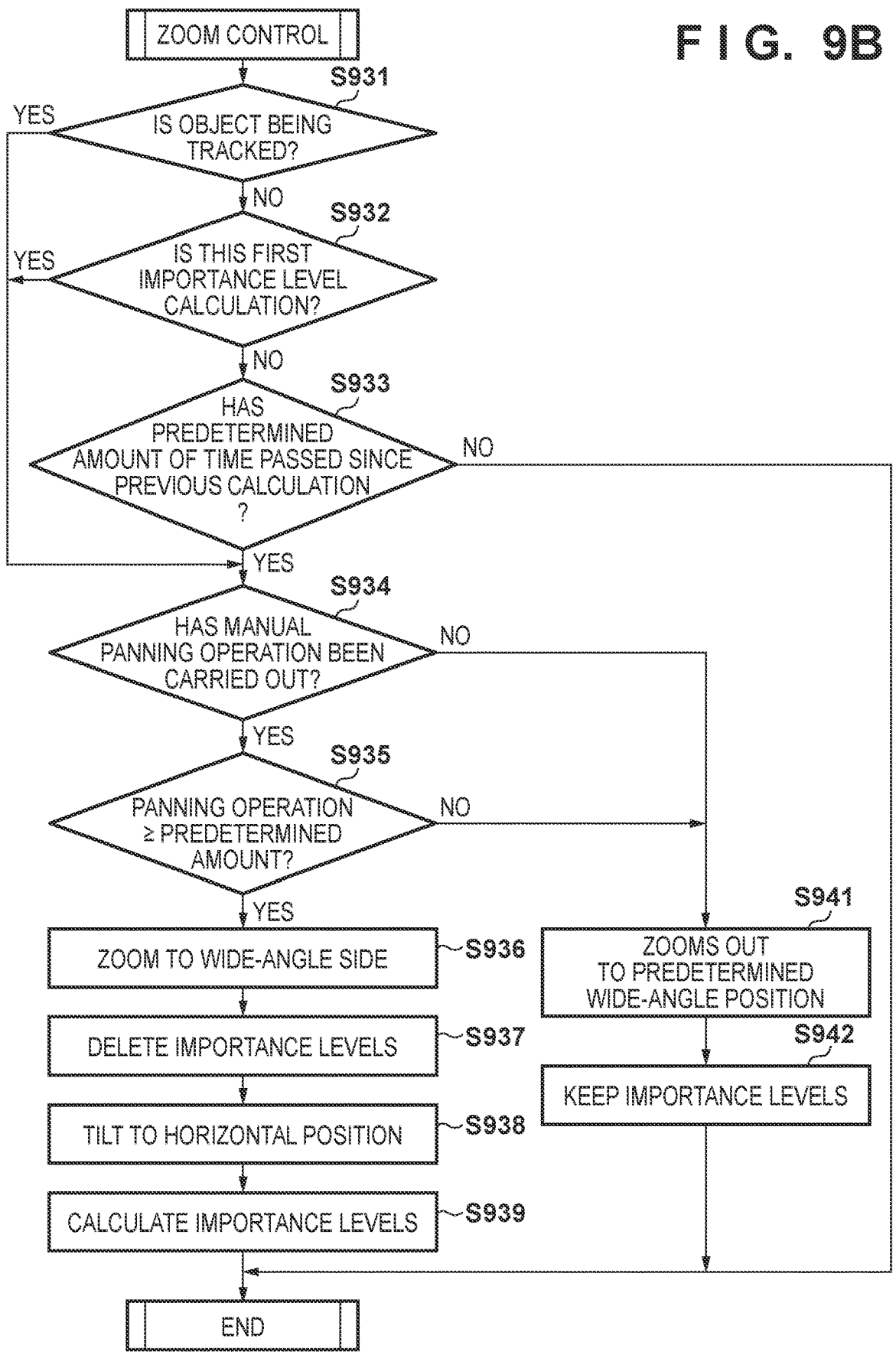
FIG. 9B is a flowchart illustrating zoom control operations carried out when finding an importance level on an area-by-area basis.

FIG. 9B is a flowchart illustrating zoom control operations carried out when finding the importance level on an area-by-area basis, which has been generally described thus far.

When the operations for finding the importance level on an area-by-area basis are started, in step S931, it is determined whether or not an object is currently being tracked. The sequence moves to step S934 if the camera is currently tracking an object, and to step S932 if the camera is not currently tracking an object.

In step S932, it is determined whether or not this is the first area-by-area importance level calculation. The sequence moves to step S934 if this is the first importance level calculation, and to step S933 if this is not the first importance level calculation.

In step S933, it is determined whether or not a predetermined amount of time has passed since the previous area-by-area importance level calculation. If the predetermined amount of time has passed, it is necessary to calculate the importance level again, and the sequence therefore moves to step S934. However, if the predetermined amount of time has not passed, the operations of this flowchart end having kept the current zoom position (angle of view).

In step S934, it is determined whether or not a manual panning operation has been carried out. If a manual panning operation has been carried out, the sequence moves to step S935, whereas if a manual panning operation has not been carried out, the sequence moves to step S941.

In step S935, it is determined whether or not the operation amount of the manual panning operation is greater than or equal to a predetermined amount. If the operation amount is greater than or equal to the predetermined amount, the area in the direction in which the user intentionally pointed the camera is considered to be the most important area. The sequence thus moves to step S936, and the zoom is driven to the wide-angle side. At this time, adjusting the control amount toward the zoom side in accordance with the movement amount of the panning operation confirmed in step S935 makes it possible to capture the object intended to be captured by the user. Having done so, the sequence moves to step S937 to calculate the importance level on an area-by-area basis again.

In step S937, the importance levels stored previously are deleted, and the sequence then moves to step S938. In step S938, tilt driving is carried out so that the angle of view is horizontal, and in step S939, the importance levels are recalculated.

On the other hand, if, in step S934 or S935, no manual panning operation has been carried out, or if a manual panning operation was carried out but the operation amount was low, the camera zooms out to a predetermined wide-angle position slightly before the wide-angle end in step S941. Then, in step S942, the stored importance levels are kept. Alternatively, if this is the first time for calculating the importance levels, the importance levels are calculated.

In this manner, when calculating the importance level on an area-by-area basis, controlling the zoom as described above makes it possible to find an important object more quickly.

(3) Determining a Search Target Area

As described above, once the importance level has been calculated for each area, an area having a high importance level is determined as a search target area. Then, a pan/tilt search target angle, necessary for capturing the search target area in the angle of view, is calculated.

Returning to the descriptions of FIG. 9A, in step S905, pan/tilt driving is carried out. Specifically, a pan/tilt driving amount is calculated by adding the image blur correction amount to a driving angle based on the pan/tilt search target angle at a control sampling frequency. Then, driving control of the tilt rotation unit 104 and the pan rotation unit 105 is carried out by the lens barrel rotation driving unit 205.

In step S906, the zoom unit 201 is controlled and zoom driving is carried out. Specifically, the zoom is driven in accordance with the state of the object to be searched out, determined in step S904. For example, if the object to be searched out is a person's face, but the face is too small in the image, the size of the face may be lower than the minimum size that can be detected. The face may therefore be unable to be detected, resulting in the face being lost by the camera. In such a case, control is carried out so as to zoom to the telephoto side and increase the size of the face of the image. On the other hand, if the face is too large in the image, the object may move out of the angle of view, depending on movement of the object, the camera itself, and so on. In such a case, control is carried out so as to zoom to the wide-angle side and reduce the size of the face in the image. Carrying out such zoom control makes it possible to maintain a state suited to tracking the object.

In step S907, it is determined whether or not a shooting instruction has been made manually, and the sequence moves to step S910 if a manual shooting instruction has been made. At this time, the manual shooting instruction may be made by pressing a shutter button, lightly striking (tapping) the camera housing with a finger or the like, entering a voice command, entering an instruction from an external device, or the like. A shooting instruction that takes a tapping operation as a trigger is determined by the device shake detection unit 209 detecting high-frequency acceleration that continues for a short period of time when the user taps the camera housing. Entering a voice command is a shooting instruction method in which when the user utters a predetermined key phrase instructing a shot to be taken (e.g., "take a picture"), and the audio processing unit 214 recognizes the voice and uses it as a trigger for shooting. Using an instruction from an external device is a shooting instruction method in which a shutter instruction signal transmitted from a smartphone or the like, which is connected to the camera over Bluetooth, using a dedicated application, is used as a trigger.

If no manual shooting instruction has been made in step S907, the sequence moves to step S908, where an automatic shooting determination is carried out. In the automatic shooting determination, whether or not to carry out automatic shooting is determined, and the shooting method is determined as well (i.e., whether to shoot a still image, a moving image, continuous images, a panorama, or the like is determined).

Determining Whether or not to Carry Out Automatic Shooting

The determination as to whether or not to carry out automatic shooting is performed in the following manner. Specifically, it is determined that automatic shooting is to be carried out in the following two cases. First, it is determined that automatic shooting is to be carried out on the basis of the importance level for each area, obtained in step S904, when the importance level exceeds a predetermined value. Second, a determination is made on the basis of a neural network.

Figure 11:
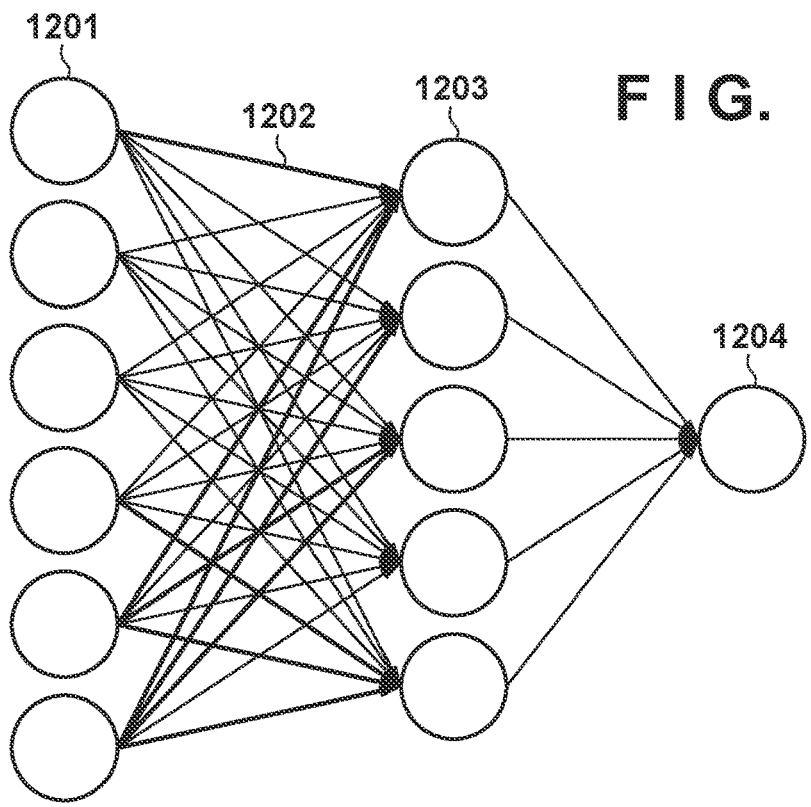
FIG. 11 is a diagram illustrating a neural network.

FIG. 11 illustrates a multilayer perceptron network, as one example of a neural network. A neural network is used to predict output values from input values. By learning input values along with the output values that model those inputs in advance, output values that follow the learned models can be estimated for new input values. A method for this learning will be described later. In FIG. 11, 1201 and the circles arranged vertically therefrom indicate an input layer of neurons, 1203 and the circles arranged vertically therefrom indicate an intermediate layer of neurons, and 1204 indicates the output layer of neurons. Arrows such as those indicated by 1202 indicate links connecting the neurons. In the determination based on a neural network, the object appearing at the current angle of view, feature amounts based on the state of the scene or the camera, and so on are provided as inputs for the input layer neurons, and values output from the output layer are obtained through computations based on forward propagation rules of the multilayer perceptron. If the output values are greater than or equal to a threshold, it is determined that automatic shooting is to be carried out. The following are used as the features of the object: the current zoom ratio; general object recognition results and face detection results at the current angle of view; the number of faces, strength of smiles in the faces, how open/closed the eyes are, the facial angles, face authentication ID numbers, and angles of the lines of sight of people serving as objects at the current angle of view; scene determination results; the amount of time that has passed since the previous shooting; the current time; the GPS position information and the amount of change therein from the previous shooting position; the current audio level; the person emitting sound; whether or not there is applause or cheering; vibration information (acceleration information, the camera state); environment information (temperature, atmospheric pressure, brightness, humidity, ultraviolet light amount); and so on. Furthermore, if information has been communicated from the external device 501, that information (the user's activity information, information of the action of the arms, biological information such as the heartbeat, and so on) is also used as features. The features are converted to numerical values within a predetermined range, and are supplied to the neurons in the input layer as feature amounts. Accordingly, it is necessary to provide a number of neurons in the input layer equivalent to the number of above-described feature amounts that are used.

In the determination based on the neural network, the output values can be varied by varying the weights of the connections between the neurons in the learning processing (described later), and the results of the determination can be applied to the learning results.

Additionally, the determination for the automatic shooting also changes depending on the startup conditions of the first control unit 223, which are loaded in step S702 of FIG. 7. For example, the unit being started up in response to a tap being detected or specific voice command is highly likely to be an operation indicating that the user currently wishes to shoot an image. The frequency of the shooting is therefore set to be higher.

Shooting Method Determination

In the shooting method determination, it is determined whether to shoot a still image, a moving image, continuous images, a panorama, or the like on the basis of the camera state, the state of objects in the periphery, and so on, which have been detected in step S901 to S904. For example, when an object (a person) is at rest, a still image is shot, whereas when the object is moving, a moving image or continuous images are shot. Meanwhile, if a plurality of objects are surrounding the camera, the current location is determined to be a scenic spot on the basis of the aforementioned GPS information, or the like, a panoramic shooting process, which generates a panoramic image by combining images shot in sequence while panning/tilting the camera, may be executed. As with the determination method described in "Determining Whether or Not to Carry out Automatic Shooting", various types of information detected before the shooting can also be determined on the basis of a neural network and used in the shooting method determination. The determination conditions in this determination process can be changed based on a learning process, which will be described later.

Returning to the descriptions in FIG. 9A, in step S909, if a determination that automatic shooting is to be carried out has been made in step S908, the sequence moves to step S910, whereas if a determination that automatic shooting is to be carried out has not been made, the automatic shooting mode processing ends.

In step S910, the automatic shooting is started. At this time, the automatic shooting is started using the shooting method determined in step S908. The focus driving control unit 204 carries out autofocus control at this time. Additionally, the exposure is controlled using an aperture control unit, a sensor gain control unit, and a shutter control unit (not shown) so that the object is at an appropriate brightness. Furthermore, after the shooting, the image processing unit 207 carries out various types of known image processing, such as auto white balance processing, noise reduction processing, gamma correction processing, and the like, and an image is generated as a result.

During the shooting, the camera may take the shot after notifying a person being shot that the shooting is taking place, if predetermined conditions are met. This notification may be carried out by, for example, emitting sound from the audio output unit 218, using the LED control unit 224 to flash an LED, or the like. The predetermined conditions include the following, for example: the number of faces, strength of smiles in the faces, how open/closed the eyes are, the facial angles and angles of the lines of sight of the people serving as objects, face authentication ID numbers, and the number of people who have been registered for personal authentication at the current angle of view; general object recognition results at the time of shooting; scene determination results; the amount of time that has passed since the previous shooting; the time of the shot; whether or not the current location is a scenic view based on GPS information; the audio level at the time of shooting; whether or not there is a person emitting sound; whether or not there is applause or cheering; vibration information (acceleration information, the camera state); environment information (temperature, atmospheric pressure, brightness, humidity, ultraviolet light amount); and so on. By providing a shooting notification on the basis of these conditions, and image with a preferable line of sight for the camera can be obtained in scenes of high importance.

When providing a notification before shooting in this manner, it is also possible to determine information of the shot image or various types of information detected before the shooting on the basis of a neural network, and determine the notification method, timing, and so on. The determination conditions in this determination process can be changed based on a learning process, which will be described later.

In step S911, an editing process is carried out, in which the image generated in step S910 is edited, added to a moving image, or the like. "Editing the image" specifically includes cropping the image on the basis of the positions of people's faces or the focus, rotating the image, adding an HDR (high dynamic range) effect, a bokeh effect, a color conversion filter effect, and so on. In the image editing, a plurality of edited images obtained by combining the above-described processing may be generated on the basis of the image generated in step S910 and saved separately from the image generated in step S910. Additionally, when processing a moving image, a process may be carried out in which moving images or still images that have already been shot are added to an edited moving image, which has already been generated, while adding special effects such as wiping, zooming, fades, and the like. In the editing carried out in step S911 as well, it is also possible to determine information of the shot image or various types of information detected before the shooting on the basis of a neural network, and determine the image editing method. The determination conditions in this determination process can be changed based on a learning process, which will be described later.

In step S912, a shot image learning information generation process is carried out. Here, information used in a learning process (described later) is generated and recorded. Specifically, this information is the following, taken from the current shot image: the zoom ratio used during shooting; general object recognition results and facial detection results at the time of shooting; the number of faces in the shot image; the strength of the smiles on the faces; how open/closed the eyes are; the facial angles; face authentication ID numbers; the angles of the lines of sight of people serving as objects; scene judgment results; the amount of time that has passed since the previous shot; the time of the shooting; the GPS position information and the amount of change therein from the position of the previous shot; the audio level at the time of shooting; people emitting sound; whether or not there is applause or cheering; vibration information (acceleration information, the camera state; environment information (temperature, atmospheric pressure, brightness, humidity, ultraviolet light amount); moving image shooting duration; whether or not the shooting has been instructed manually; and so on. A score, which is the output of a neural network which quantifies the user's image preferences, can also be computed. This information is generated and recorded as tag information in the shot image file. Alternatively, the information may be written into the non-volatile memory 216, or the information of each shot image may be saved in the recording medium 221 in list format as what is known as "catalog data".

In step S913, past shooting information is updated. Specifically, the number of shots taken on an area-by-area basis, the number of shots taken per person registered for personal authentication, the number of shots taken per object recognized through general object recognition, and the number of shots taken per scene from the scene judgment, which have been described in step S908, are counted up by one for the number of images that have been shot this time.

Learning Process

Learning according to the user's preferences, as carried out in the present embodiment, will be described next. In the present embodiment, the learning processing unit 219 employs a machine learning algorithm to carry out learning according to the user's preferences, using a neural network such as that illustrated in FIG. 11. The neural network is a device used to predict output values from input values. By learning actual input values along with actual output values, output values can be estimated for new input values. Learning according to the user's preferences with respect to the above-described automatic shooting, automatic editing, and object searches is carried out using a neural network. Operations are also carried out for changing the registration of object information (the results of face authentication, general object recognition, and the like), shooting notification control, low-power mode control, automatic file deletion, and the like, which also serve as feature data input to the neural network, through learning.

In the present embodiment, learning processing is applied to the following operations.

(1) automatic shooting
(2) automatic editing
(3) object searching
(4) object registration
(5) shooting notification control
(6) low-power mode control
(7) automatic file deletion
(8) image blur correction
(9) automatic image transfer Of the foregoing operations to which the learning processing is applied, the automatic editing, automatic file deletion, and automatic image transfer are of no direct relation to the main subject of the present invention, and will therefore not be described.

Automatic Shooting

Learning for automatic shooting will be described next. In automatic shooting, learning is carried out so that an image that meets the user's preferences is shot automatically. As described using the flowchart in FIG. 9A, a learning information generation process (step S912) is carried out after shooting (after step S910). An image to be learned is selected through a method that will be described later, and learning is carried out by changing the weighting of the neural network on the basis of learning information included in the image.

The learning is carried out by changing the neural network that determines the automatic shooting timing, and changing the neural network that determines the shooting method (shooting a still image, a moving image, continuous images, a panoramic image, or the like).

Object Searching

Learning for object searching will be described next. In object searching, learning is carried out so that an object that meets the user's preferences is searched out automatically. As described using the flowchart in FIG. 9A, an object is searched out by calculating an importance level for each area and then carrying out pan, tilt, and zoom driving, in the object search process (step S904). The learning is carried out on the basis of shot images, detection information currently being searched out, and the like, and is reflected as learning results by changing the weighting of the neural network. Object searches that reflect the learning are carried out by inputting various types of detection information used during the search operations into the neural network and then determining the importance levels. In addition to calculating the importance level, controlling the pan/tilt searching method (based on speed or movement frequency), controlling the object search region in accordance with the movement speed of the camera, and so on are also carried out, for example.

Object Registration

Learning for object registration will be described next. In object registration, learning is carried out so that an object that meets the user's preferences is registered and ranked automatically. Face authentication registration, registration for general object recognition, registration of gestures, voice recognition, sound-based scene recognition, and the like are carried out as the learning, for example. Authentication registration is carried out for people and objects, and ranks are set on the basis of the number of times and frequency at which images are acquired, the number of times and frequency at which shots are taken manually, the frequency with which the object being searched out appears, and so on. The registered information is registered as inputs for making determinations using respective neural networks.

Shooting Notification Control

Learning for shooting notifications will be described next. As described in step S910 in FIG. 9A, the camera may take a shot after notifying a person being shot that the shooting is taking place, if predetermined conditions are met, immediately before taking the shot. For example, the sight line of the object is guided visually through pan/tilt driving, the attention of the object is caught using a speaker sound emitted from the audio output unit 218, flashing an LED light using the LED control unit 224, and so on. Whether to use the detection information for learning is determined immediately after the above-described notification on the basis of whether or not detection information of the object (e.g., the strength of a smile, sight line detection, gestures, and so on) has been obtained, and the learning is then carried out by changing the weighting of the neural network.

The detection information from immediately before the shooting is input to the neural network, and whether or not to make a notification, the various operations to be carried out (sound (sound level/sound type/timing), light (lighting time, speed), and the orientation of the camera (pan/tilting motion)), and the like are determined.

Low-Power Mode Control

The supply of power to the main CPU (the first control unit 223) is controlled on and off as described using FIGS. 7 and 8, but learning is also carried out with respect to the conditions for returning from the low-power mode, the conditions for transferring to the low-power mode, and so on. Learning of the conditions for canceling the low-power mode will be described next.

Tap Detection

As described above, the predetermined amount of time TimeA, the predetermined threshold ThreshA, and so on are changed through learning. Preliminary tap detection is also carried out in a state where the above-described tap detection threshold has been lowered, and the parameters of TimeA, ThreshA, and so on are set for easier detection based on whether or not a preliminary tap detection has been determined before the tap detection. If it is determined, from the camera detection information following the detection of the tap, that the tap is not a cause for startup, the parameters of TimeA, ThreshA, and so on are set to make the tap detection more difficult.

Shake State Detection

As described above, the predetermined amount of time TimeB, the predetermined threshold ThreshB, the predetermined number of times CountB, and so on are changed through learning. If the result of determining the shake state meets the startup conditions, startup is carried out; however, if it is determined, from the camera detection information obtained in a predetermined amount of time following the startup, that the results were not a cause for the startup, learning is carried out to make startup based on the shake state determination more difficult. Additionally, if it is determined that shots are being taken frequently in a state of a significant amount of shake, settings are made to make startup based on the shake state determination more difficult.

Sound Detection

Learning can be carried out by the user manually setting a specific voice, a specific audio scene to be detected, a specific sound level, or the like through communication using a dedicated application in the external device 301, for example. Learning can also be carried out by setting a plurality of detection methods in advance in the audio processing unit, selecting images to be learned through a method that will be described later, learning pre- and post-sound information included in the images, and then setting a sound determination to be used as a cause for startup (a specific sound command, an audio scene such as cheering or applause, or the like).

Environment Information Detection

Learning can be carried out by the user manually setting a change in environment information to be used as a startup condition through communication using a dedicated application in the external device 301, for example. For example, the startup can be caused under specific conditions for the absolute amount, the change amount, or the like of the temperature, atmospheric pressure, brightness, humidity, and ultraviolet light amount. Determination thresholds based on each piece of environment information can also be learned. If it is determined, from the camera detection information after startup using the environment information, that the information was not a cause for startup, the parameters of the respective determination thresholds are set to make it more difficult for environment changes to be detected.

The above-described parameters also change according to the power remaining in a battery. For example, the various determinations are made more difficult when there is little power remaining in the battery, whereas the determinations are made easier when there is a large amount of power remaining in the battery. Specifically, there are situations where a determination is made to start up the camera when a large amount of power remains in the battery, even when the shake state detection results, sounds scene detection results, and so on do not absolutely indicate that the user wishes the camera to start up.

Additionally, the determination of the conditions for canceling the low-power mode can be made on the basis of a neural network, using information of the shake detection, sound detection, detection of the amount of time that has passed, the various types of environment information, the power remaining in the battery, and so on. In this case, an image to be learned is selected through a method that will be described later, and learning is carried out by changing the weighting of the neural network on the basis of learning information included in the image.

Learning of the conditions for transitioning to the low-power mode will be described next. As indicated in FIG. 7, the mode transitions to the low-power mode when it is determined, in the mode setting determination of step S704, that the mode is neither the "automatic shooting mode", the "automatic editing mode", the "automatic image transfer mode", the "learning mode", nor the "automatic file deletion mode". The conditions for determining the respective modes are as described above, but the conditions for determining the respective modes also change through learning.

Automatic Shooting Mode

As described above, automatic shooting is carried out by determining the importance level on an area-by-area basis and then controlling the pan/tilt while searching out an object, but the automatic shooting mode is canceled if it is determined that an object to be shot is not present. For example, the automatic shooting mode is canceled when the importance levels of all the areas, or a value obtained by adding together the importance levels of the areas, have dropped below a predetermined threshold. At this time, the predetermined threshold can also be reduced in accordance with the amount of time that has passed since transitioning to the automatic shooting mode. It is made easier to transition to the low-power mode as the amount of time that has passed since transitioning to the automatic shooting mode increases.

Additionally, the low-power mode can be controlled in accordance with the power remaining in the battery by changing the predetermined threshold depending on the power remaining in the battery. For example, when there is little power remaining in the battery, the threshold is increased to make it easier to transition to the low-power mode, whereas when there is a large amount of power remaining in the battery, the threshold is reduced to make it more difficult to transition to the low-power mode. Here, the parameters for the conditions for canceling the low-power mode the next time (the threshold TimeC for the amount of time that has passed) are set for the second control unit 211 (the sub CPU) in accordance with the amount of time that has passed since the previous transition to the automatic shooting mode and the number of shots that have been taken. The above-described thresholds change through the learning. The learning is carried out by manually setting a shooting frequency, a startup frequency, and so on through communication using a dedicated application in the external device 301, for example.

Meanwhile, the configuration may be such that distribution data is accumulated for the average value of, or periods of time in, the time that passes from when the power button of the camera 101 is turned on to when the power button is turned off, and the parameters are learned. In this case, learning is carried out so that the time for returning from the low-power mode, transitioning to the low-power mode, and so on becomes shorter for users that only keep the power on for a short time, and longer for users that keep the power on for a long time.

Learning is also carried out using detection information during the search. Learning is carried out so that the time for returning from the low-power mode, transitioning to the low-power mode, and so on becomes shorter while it is determined that there are many objects set as important through learning, and becomes longer while it is determined that there are not many such important objects.

Image Blur Correction

Learning for image blur correction will be described next. The image blur correction is carried out by calculating a correction amount in step S902 of FIG. 9A and then carrying out pan/tilt driving in step S905 on the basis of the correction amount. In the image blur correction, learning is carried out so that the correction matches the features of the user's shake. The direction and magnitude of blur can be estimated in a shot image by using a Point Spread Function (PSF), for example. In the learning information generation carried out in step S912 of FIG. 9A, the estimated direction and magnitude of the blur is added to the image as information.

In the learning mode processing carried out in step S716 of FIG. 7, the weighting of a neural network for image blur correction is learned by using the estimated direction and magnitude of the blur as outputs, and using the various types of detection information acquired during the shooting (motion vector information of the image in a predetermined amount of time before the shooting, movement information of the detected object (a person or an object), vibration information (gyrosensor output, acceleration output, the camera state) as inputs. The determination may be carried out by adding other information as inputs as well, such as environment information (temperature, atmospheric pressure, brightness, humidity), sound information (audio scene determination, specific audio detection, sound level changes), time information (the amount of time that has passed since startup, the amount of time that has passed since the previous shooting), location information (GPS position information, change amounts in position movement), and so on.

When calculating the image blur correction amount in step S902, inputting the above-described detection information to the neural network makes it possible to estimate the magnitude of the blur in the image captured at that instant. Control for increasing the shutter speed and so on can also be carried out when the estimated magnitude of the blur is high. When the estimated magnitude of the blur is high, the resulting image will be blurry, and thus a method that prohibits the shot from being taken can also be used.

Because there are limits to the pan/tilt driving angles, once the ends of the driving ranges have been reached, no further correction can be carried out. However, estimating the magnitude and direction of the blur at the time of shooting makes it possible to estimate the pan/tilt driving range required for correcting the image blur during exposure. If there is no leeway in the range of movement during exposure, major blurring can be suppressed by increasing the cutoff frequency of the filter used when calculating the image blur correction amount so that the range of movement is not exceeded. Furthermore, when it appears that the range of movement will be exceeded, starting the exposure after first rotating the pan/tilt angle in the direction opposite from the direction in which it appears that the range of movement will be exceeded immediately before the exposure makes it possible to stay within the range of movement and shoot an image with no blurriness. This makes it possible to learn image blur correction that matches the characteristics when the user shoots an image, the way the user uses the camera, and so on, which in turn makes it possible to prevent shot images from being blurry.

In the above-described "Shooting Method Determination", it may be determined whether or not to carry out "panning shooting", in which moving objects are sharp but the stationary background is undergoing motion blur. In this case, the pan/tilt driving speed for shooting the object with no blur may be estimated from the detection information leading up to the shooting, and object blur correction may then be carried out. At this time, inputting the above-described detection information to an already-trained neural network makes it possible to estimate the driving speed. The image is divided into respective blocks and the PSF is estimated for each block in order to estimate the direction and magnitude of the blur in blocks where a main object is located, and the learning is carried out on the basis of that information.

The amount of background blur can also be learned from information of images selected by the user. In this case, the magnitude of the blur in blocks where the main object is not located is estimated, and the user's preferences can be learned on the basis of that information. By setting the shutter speed used during shooting on the basis of the preferred background blur amount which has been learned, shooting having a panning effect that matches the user's preferences can be carried out automatically.

Learning methods will be described next. "Learning in the camera" and "learning by linking to a communication device" can be given as learning methods.

The methods of learning in the camera will be described below. The learning in the camera according to the present embodiment includes the following methods.
(1) learning from detection information obtained during manual shooting
(2) learning from detection information obtained during object searches Learning from Detection Information Obtained During Manual Shooting As described with reference to steps S907 to S913 in FIG. 9A, in the present embodiment, the camera 101 can shoot through two methods, namely manual shooting and automatic shooting. If a manual shooting instruction has been made in step S907, information indicating that the shot image is an image shot manually is added in step S912. If, however, the image has been shot having determined that the automatic shooting is on in step S909, information indicating that the shot image is an image shot automatically is added in step S912.

Here, if the image has been shot manually, it is highly likely that the image has been shot on the basis of the user's preferred object, preferred scene, preferred location and time interval, and so on. Accordingly, learning is carried out on the basis of feature data obtained during the manual shooting, learning information of the shot image, and so on. Additionally, learning pertaining to the extraction of feature amounts from the shot image, personal authentication registration, the registration of expressions on an individual-by-individual basis, the registration of combinations of people, and so on is carried out on the basis of the detection information obtained during the manual shooting. Learning is also carried out to change the importance level of nearby people or objects on the basis of the detection information obtained during object searching, e.g., the expressions of objects registered as individuals.

Learning from Detection Information Obtained During Object Searches

During object search operations, the types of people, objects, and scenes an object which has been registered for personal authentication appears with simultaneously are determined, and a ratio of time which these objects appear simultaneously in the same angle of view is calculated. For example, the ratio of time for which a person A, who is an object which has been registered for personal authentication, appears simultaneously with a person B, who is also an object which has been registered for personal authentication, is calculated. When the person A and the person B are in the same angle of view, each type of detection information is saved as learning data so that the score for automatic shooting determination increases, and learning is then carried out through the learning mode processing (step S716).

As another example, the ratio of time for which the person A, which is an object which has been registered for personal authentication, appears simultaneously with an object "cat", which has been determined through general object recognition, is calculated. When the person A and the cat are in the same angle of view, each type of detection information is saved as learning data so that the score for automatic shooting determination increases, and learning is then carried out through the learning mode processing (step S716).

Furthermore, when a strong smile, or an expression indicating joy, surprise, or the like, has been detected in the person A, who is an object which has been registered for personal authentication, learning is carried out so that objects appearing simultaneously are considered important. Alternatively, if an expression indicating anger, seriousness, or the like has been detected, objects appearing simultaneously are unlikely to be important, and processing is carried out so that no learning is carried out, for example.

Learning by linking to an external device, according to the present embodiment, will be described next. The learning by linking to an external device according to the present embodiment includes the following methods.
(1) learning from images having been acquired by an external device
(2) learning by inputting determination values for images through an external device
(3) learning by analyzing images saved in an external device
(4) learning from information uploaded to an SNS server by an external device
(5) learning by changing camera parameters using an external device
(6) learning from information of an image manually edited using an external device Learning from Images Having been Acquired by an External Device As described with reference to FIG. 3, the camera 101 and the external device 301 have communication units that carry out the first and second communication 302 and 303. Images are transmitted and received primarily through the first communication 302, and images within the camera 101 can be transmitted to the external device 301 using a dedicated application provided in the external device 301. Additionally, thumbnail images of the image data saved in the camera 101 can be browsed using a dedicated application provided in the external device 301. By selecting an image that he or she likes from the thumbnail images, confirming the image, and instructing the image to be acquired, the user can transmit the image to the external device 301.

At this time, the image has been acquired on the basis of the user's selection, and it is therefore highly likely that the acquired image is an image that the user likes. As such, it is determined that the acquired image is an image that should be learned, and various types of learning for the user's preferences can be carried out by carrying out learning on the basis of the learning information of the acquired image.

Figure 12:
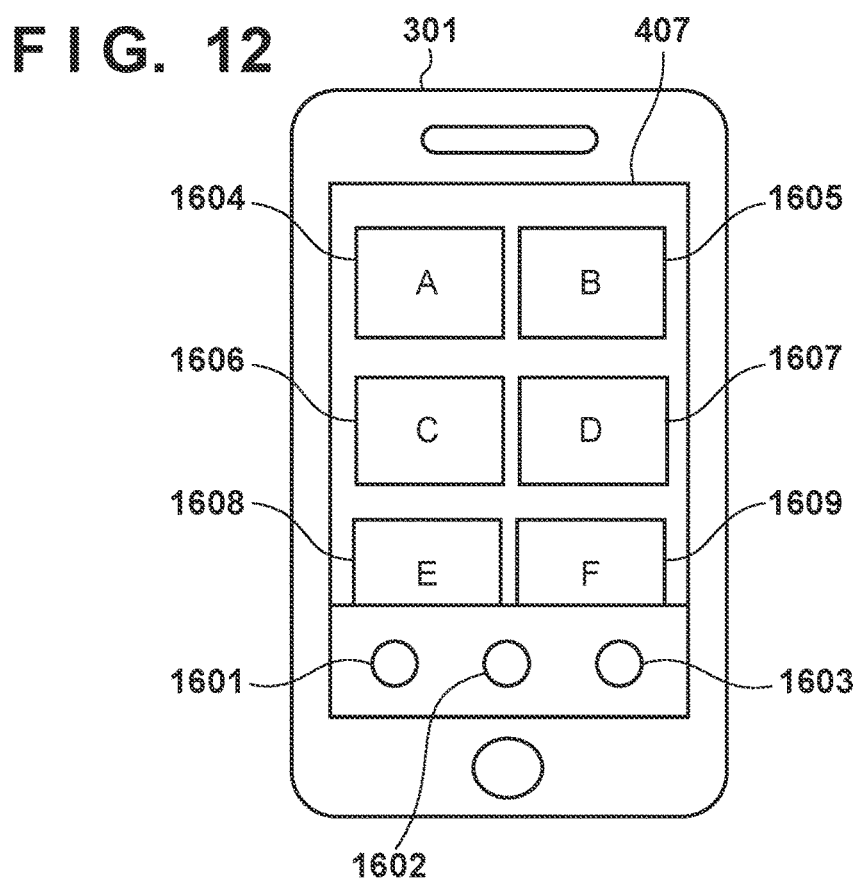
FIG. 12 is a diagram illustrating the browsing of images in an external device.

An example of these operations will be described here. FIG. 12 illustrates an example of the browsing of images in the camera 101 using a dedicated application provided in the external device 301. Thumbnail images (1604 to 1609) of image data saved within the camera are displayed in the display unit 407, and the user can select and acquire an image that he or she likes. At this time, buttons 1601, 1602, and 1603, which constitute a display method changing unit for changing the display method, are provided.

Pressing the button 1601 transitions to a date/time priority display mode, in which the images in the camera 101 are displayed in the display unit 407 by the date/time at which those images were shot. For example, the image with the newest date/time is displayed at the position indicated by 1604, and the image with the oldest date/time is displayed at the position indicated by 1609.

Pressing a button 1602 transitions to a recommended image priority display mode. On the basis of the score for determining the user's preferences for each image, computed in step S912 in FIG. 9A, the images within the camera 101 are displayed in the display unit 407 in order from the image with the highest score. For example, the image with the highest score is displayed at the position indicated by 1604, and the image with the lowest score is displayed at the position indicated by 1609.

By pressing the button 1603, an object such as a person or an inanimate object can be designated, and designating a specific person or object makes it possible to display only images having that specific object. The buttons 1601 to 1603 can also be set to be on simultaneously. For example, if all of these buttons are set to be on, only images containing the designated object are displayed, with images shot more recently and having a higher score being displayed preferentially. In this manner, the learning is carried out according to the user's preferences for the shot images as well, which makes it possible to extract only images matching the user's preferences, from among large amounts of images that have been shot, using simple confirmation operations.

Learning by Inputting Determination Values for Images through an External Device As described above, the camera 101 and the external device 301 include communication units, and images saved in the camera 101 can be browsed using a dedicated application provided in the external device 301. Here, the configuration may be such that the user adds a score to each image. The user can add a high score (e.g., 5 points) to an image he or she likes and the low score (e.g., 1 point) to an image he or she does not like, and the configuration is such that the camera learns on the basis of user operations. The score for each image is used along with the learning information for re-learning within the camera. The learning is carried out so that the output of the neural network, which takes feature data from specified image information as its inputs, approaches a score designated by the user.

In the present embodiment, the configuration is such that the user uses the external device 301 to input determination values for images that have been shot. However, the configuration may be such that the user operates the camera 101 to input determination values for the images directly. In this case, the camera 101 is provided with a touch panel display, for example, and the user presses a GUI button displayed in a screen display part of the touch panel display to transition to a mode for displaying images that have been shot. The same type of learning is then carried out using a method such as the user inputting determination values for the images that have already been shot while confirming each image.

Learning by Analyzing Images Saved in an External Device

The external device 301 includes the storage unit 404, and the configuration is assumed to be such that images aside from those shot by the camera 101 are recorded in the storage unit 404. At this time, the images saved in the external device 301 can be easily browsed by the user, and can also be easily uploaded to a shared server through the public wireless control unit 406. It is therefore highly likely that many images that match the user's preferences are present.

The control unit 411 of the external device 301 is configured to be capable of processing the images saved in the storage unit 404, using a dedicated application, with a similar level of performance as the learning processing unit 219 in the camera 101. Learning is then carried out by communicating the processed learning data to the camera 101. Alternatively, the configuration may be such that images, data, or the like that are to be learned are transmitted to the camera 101 and then learned within the camera 101. A configuration is also possible in which images that are to be learned are selected by the user, using a dedicated application, from among the images saved in the storage unit 404, and are then learned.

Learning from Information Uploaded to an SNS Server by an External Device

A method will now be described in which information from a social networking service (SNS), which is a service, website, or the like that constructs a social networking service with the primary goal of connecting people with each other, is used for learning. There are techniques in which, when an image is uploaded to an SNS, tags pertaining to the image are input from the external device 301 and are then transmitted along with the image. There are also techniques in which the user inputs whether he or she likes or dislikes an image uploaded by another user, and thus it can be determined whether an image uploaded by another user is one that matches the preferences of the owner of the external device 301.

As described above, images uploaded by the user him or herself, and information pertaining to images, can be acquired using a dedicated SNS application downloaded to the external device 301. Images that match the user's preferences, tag information, and so on can also be acquired by inputting whether or not the user likes an image uploaded by another user. This makes it possible to carry out learning within the camera 101 by analyzing those images, the tag information, and so on.

The control unit 411 of the external device 301 is configured to be capable of acquiring images uploaded by the user, images determined to be liked by the user, and so on as described above, and carry out processing with similar performance as the learning processing unit 219 within the camera 101. Learning is then carried out by communicating the processed learning data to the camera 101. Alternatively, the configuration may be such that images that are to be learned are transmitted to the camera 101 and then learned within the camera 101.

Information of an object that is likely to match the user's preferences can be estimated from object information set in the tag information (e.g., object information indicating the type of the object, such as a dog or cat, scene information indicating a beach or the like, expression information indicating a smile or the like, and so on). Learning is then carried out by registering the object as an object to be detected, which is input to the neural network.

A configuration is also possible in which the information of images currently popular throughout the world is estimated from statistical values for the above-described SNS tag information (image filter information, object information, and so on), and can then be learned within the camera 101.

Learning by Changing Camera Parameters Using an External Device

As described above, the camera 101 and the external device 301 include communication units. Learning parameters (neural network weighting, the selection of objects input to the neural network, and so on) currently set in the camera 101 can be communicated to the external device 301 and saved in the storage unit 404 of the external device 301. Additionally, learning parameters set in a dedicated server can be acquired through the public wireless control unit 406 using a dedicated application provided in the external device 301, and set as the learning parameters within the camera 101. Thus, by setting the parameters from a certain point in time in the external device 301 and setting those parameters in the camera 101, the learning parameters can be restored. Additionally, learning parameters held by another user can be acquired through a dedicated server and set in the user's own camera 101.

Additionally, voice commands, authentication registrations, and gestures registered by the user may be capable of being registered using a dedicated application provided in the external device 301, and important locations may be registered as well. This information is treated as shooting triggers, input data for automatic shooting determinations, and so on during the automatic shooting mode processing (FIG. 9A). Additionally, using a configuration that makes it possible to set the shooting frequency, startup interval, ratio of still images to moving images, preferred images, and so on, the startup interval and so on described above in "Low-Power Mode Control" may be set.

Learning from Information of an Image Manually Edited Using an External Device

The dedicated application in the external device 301 can be provided with a function that allows the user to edit images manually, and the details of the editing operations can be fed back into the learning process. For example, editing can be carried out which adds image effects (cropping, rotation, wiping, zooming, fades, color conversion filter effects, time, the still image/moving image ratio, BGM, and so on). A neural network for automatic editing is then trained with the learning information from the image so that it is determined to add the image effects that have been edited manually.

A learning processing sequence will be described next. In the mode setting determination carried out in step S704 of FIG. 7, it is determined whether or not the learning process should be carried out. The learning mode processing of step S716 is carried out if it has been determined that the learning process should be carried out.

The learning mode determination conditions will be described first. Whether or not to transition to the learning mode is determined on the basis of the amount of time that has passed since the previous learning process, the number of pieces of information that can be used in the learning, whether there has been an instruction to carry out the learning process made through a communication device, and so on. The flow of the process for determining whether or not to transition to the learning mode, carried out within the mode setting determination process of step S704, is indicated in FIG. 13.

Figure 13:
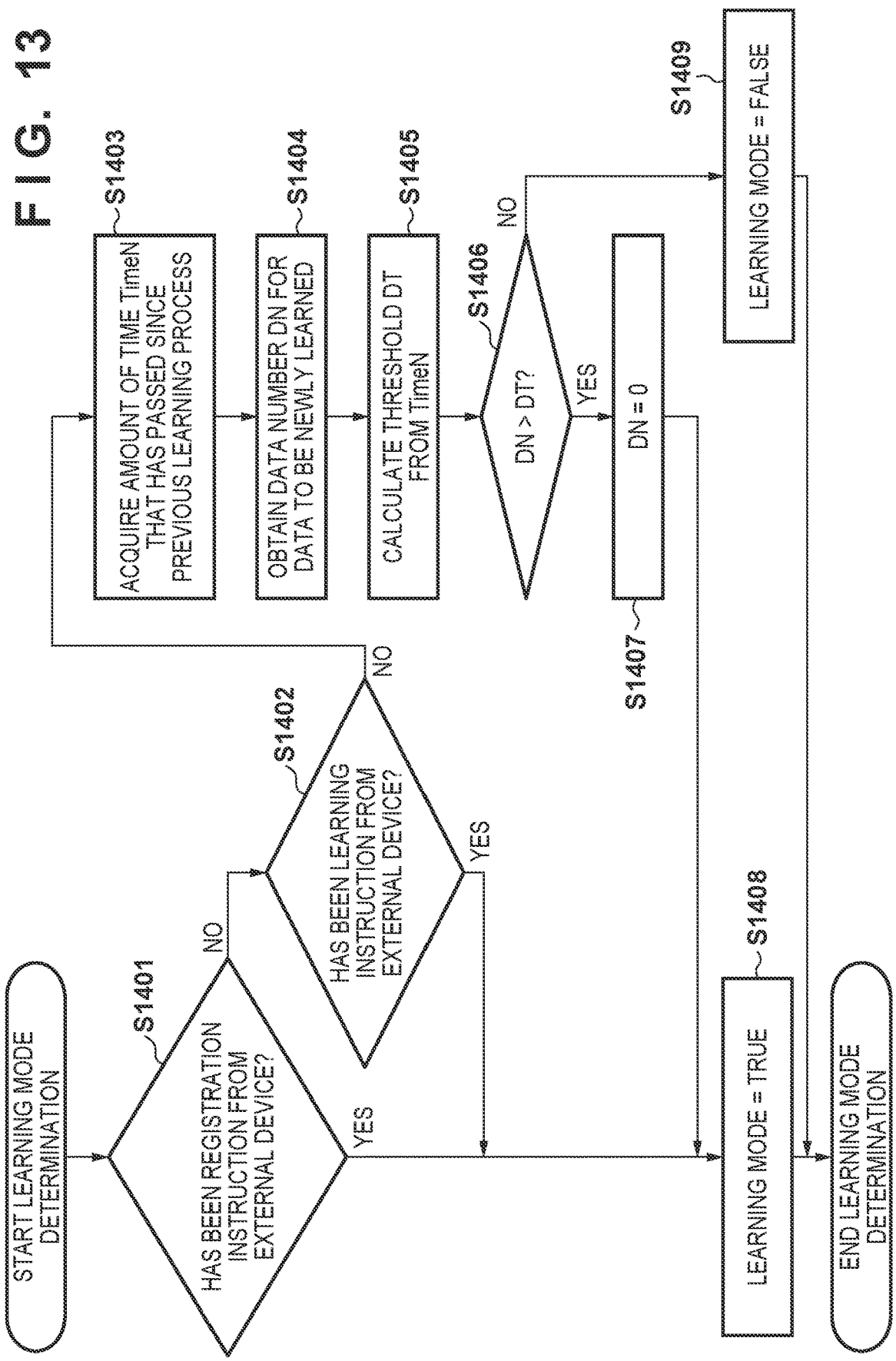
FIG. 13 is a flowchart illustrating learning mode determination.

The processing indicated in FIG. 13 begins when the learning mode determination is instructed to start in the mode setting determination process of step S704. In step S1401, it is determined whether or not there has been a registration instruction from the external device 301. Here, "registration" refers to a determination as to whether or not there has been a registration instruction for learning, such as the above-described "Learning from Images having been Acquired by an External Device", "Learning by Inputting Determination Values for Images through an External Device", and "Learning by Analyzing Images Saved in an External Device".

If there has been a registration instruction from the external device 301 in step S1401, the sequence moves to step S1408, where the learning mode determination is set to "true" so that the process of step S716 is carried out. The learning mode determination process then ends. However, if there has been no registration instruction from the external device in step S1401, the sequence moves to step S1402.

In step S1402, it is determined whether or not there has been a learning instruction from the external device. Here, the "learning instruction" refers to a determination as to whether or not there has been an instruction to set learning parameters, as with "Learning by Changing Camera Parameters Using an External Device". If there has been a learning instruction from the external device in step S1402, the sequence moves to step S1408, where the learning mode determination is set to "true" so that the process of step S716 is carried out. The learning mode determination process then ends. However, if there has been no learning instruction from the external device in step S1402, the sequence moves to step S1403.

In step S1403, an amount of time TimeN that has passed since the previous learning process (the recalculation of the neural network weighting) was carried out is acquired, after which the sequence moves to step S1404. In step S1404, a data number DN for the data to be newly learned (the number of images designated for learning during the amount of time TimeN that has passed since the previous learning process was carried out) is acquired, after which the sequence moves to step S1405. In step S1405, a threshold DT for determining whether or not to enter the learning mode on the basis of the amount of time TimeN that has passed is computed. The settings are such that it is easier to enter the learning mode the lower the value of the threshold DT is. For example, DTa, which is the value of the threshold DT when TimeN is less than a predetermined value, is set to be higher than DTb, which is the value of the threshold DT when TimeN is greater than the predetermined value, and the threshold is set to decrease as time passes. Thus, even if there is little learning data, it is easier to enter the learning mode when a greater amount of time has passed. Carrying out learning again makes it easier for the camera to change through learning in accordance with the amount of time for which the camera is used.

Once the threshold DT has been computed in step S1405, the sequence moves to step S1406, where it is determined whether or not the data number DN for learning is greater than the threshold DT. If the data number DN is greater than the threshold DT, the sequence moves to step S1407, where DN is set to 0. The sequence then moves to step S1408, where the learning mode determination is set to "true" so that the process of step S716 (FIG. 7) is carried out. The learning mode determination process then ends.

If DN is less than or equal to the threshold DT in step S1406, the sequence moves to step S1409. Here, there is neither a registration instruction nor a learning instruction from the external device, and the data number for learning is less than or equal to the predetermined value. Accordingly, the learning mode determination is set to "false" so that the processing of step S716 is not carried out, after which the learning mode determination process ends.

Figure 14:
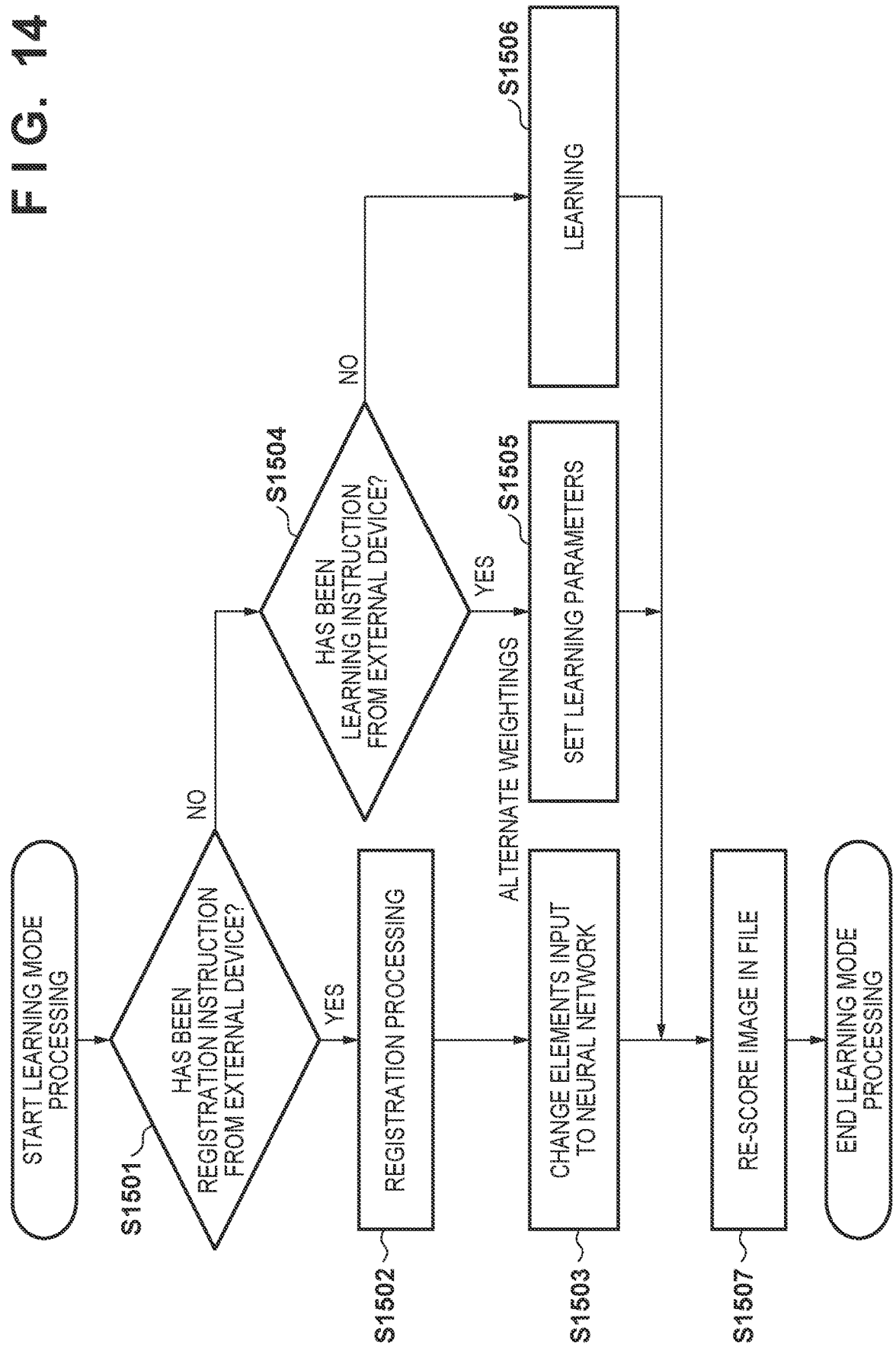
FIG. 14 is a flowchart illustrating a learning process.

The processing carried out within the learning mode process (step S716) will be described next. FIG. 14 is a detailed flowchart illustrating operations carried out in the learning mode process.

The processing illustrated in FIG. 14 starts when the learning mode is determined in step S715 of FIG. 7 and the sequence moves to step S716. In step S1501, it is determined whether or not there has been a registration instruction from the external device 301. If there has been a registration instruction from the external device 301 in step S1501, the sequence moves to step S1502. In step S1502, various registration processes are carried out.

The various types of registration are registrations of features to be input to the neural network, such as registration for face authentication, registration for general object recognition, the registration of sound information, the registration of location information, and so on. Once the registration processes end, the sequence moves to step S1503, where the elements input to the neural network are changed on the basis of the information registered in step S1502. The sequence moves to step S1507 once the process of step S1503 ends.

If it is determined in step S1501 that there has been no registration instruction from the external device 301, the sequence moves to step S1504, where it is determined whether or not there has been a learning instruction from the external device 301. If there has been a learning instruction from the external device 301, the sequence moves to step S1505, where the learning parameters communicated from the external device 301 are set in the various determiners (i.e., neural network weighting and the like). The sequence then moves to step S1507.

However, if there has been no learning instruction from the external device 301 in step S1504, learning (recalculation of the weighting of the neural network) is carried out in step S1506. The process of step S1506 is carried out when the data number DN to be learned exceeds the threshold DT and the respective determiners are to be relearned, as described using FIG. 13. The re-learning is carried out using a method such as differential reverse propagation or gradient descent, the weightings in the neural network are recalculated, and the parameters of the determiners are changed. Once the learning parameters have been set, the sequence moves to step S1507.

In step S1507, the image in the file is re-scored. In the present embodiment, scores are given to all of the shot images saved in a file (the recording medium 221) on the basis of the learning results, and the configuration is such that automatic editing, automatic file deletion, and the like are carried out in accordance with the provided scores. Accordingly, when the learning parameters have been set through relearning or from the external device, it is also necessary to update the scores given to images that have already been shot. Thus in step S1507, recalculation is carried out so as to give new scores to the shot images saved within the file, and when this process ends, the learning mode processing ends as well.

The present embodiment describes a configuration in which the learning is carried out within the camera 101. However, the same learning effects can be achieved even with a configuration in which the external device 301 is provided with a learning function, the data necessary for learning is communicated to the external device 301, and learning is only executed in the external device. In this case, the configuration may be such that learning is carried out by using communication to set parameters, such as neural network weighting, which have been learned in the external device, in the camera 101, as described above in "Learning by Changing Camera Parameters Using an External Device".

Alternatively, the configuration may be such that a learning function is provided in both the camera 101 and the external device 301, with learning information held by the external device 301 being communicated to the camera 101 when the learning mode processing (step S716) is to be carried out in the camera 101, and learning then being carried out by merging the learning parameters, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-229210 filed Dec. 6, 2018 which is hereby incorporated by reference herein in its entirety.

What is claimed is:

1. An image capturing apparatus comprising:
an image capturing device configured to capture an object image;

at least one processor or circuit and a memory storing instructions to cause the at least one processor or circuit to perform operations of the following units of the image capturing apparatus:

a calculating unit configured to divide a shooting angle of view of the image capturing device into a plurality of areas and calculate an importance level for each of the plurality of areas; and a control unit configured to carry out control so that a zoom unit changes the shooting angle of view of the image capturing device to a wide-angle side, when the imaging direction of the image capturing device is changed, wherein the calculating unit recalculates the importance level for each of the plurality of areas, when the imaging direction of the image capturing device is changed, and wherein the control unit deletes the importance level stored previously in the case where an operation amount when the image capturing device has been subjected to a manual pan operation is greater than or equal to a predetermined amount.

2. The image capturing apparatus according to claim 1, wherein when the calculation of the importance level by the calculating unit is the first calculation, or when a predetermined amount of time has passed following the previous calculation of the importance level, the control unit carries out control so that the zoom unit changes the shooting angle of view to the wide-angle side.

3. An image capturing apparatus comprising:

an image capturing device configured to capture an object image;

at least one processor or circuit and a memory storing instructions to cause the at least one processor or circuit to perform operations of the following units of the image capturing apparatus:

a searching unit configured to search for an object in the image data captured by the image capturing device;

a calculating unit configured to divide the shooting angle of view of the image capturing device into a plurality of areas and calculate an importance level for each of the plurality of areas, and a control unit configured to store the importance level calculated by the calculating unit, wherein the searching unit re-searches for an object in the image data captured by the image capturing device, when the imaging direction of the image capturing device is changed, and wherein the control unit deletes the importance level stored previously in the case where an operation amount when the image capturing device has been subjected to a manual pan operation is greater than or equal to a predetermined amount.

4. The image capturing apparatus according to claim 3, wherein the control unit carries out control so that a zoom unit changes a shooting angle of view to a wide-angle side when the imaging direction of the image capturing device is changed, and wherein the control unit controls the amount by which the zoom unit changes the shooting angle of view to the wide-angle side on the basis of an operation amount when the imaging direction of the image capturing device has been changed by a manual pan operation.

5. The image capturing apparatus according to claim 4, wherein the control unit carries out control so that the zoom unit moves the shooting angle of view to the wide-angle side in the case where the operation amount when the image capturing device has been subjected to a manual pan operation is greater than or equal to a predetermined amount.

6. The image capturing apparatus according to claim 4, wherein the control unit carries out control so that the zoom unit moves the shooting angle of view to a predetermined wide-angle position before the wide-angle end in the case where the operation amount when the image capturing device has been subjected to a manual pan operation is less than a predetermined amount.

7. The image capturing apparatus according to claim 6, wherein the control unit saves the importance level stored previously in the case where the operation amount when the image capturing device has been subjected to a manual pan operation is less than a predetermined amount.

8. The image capturing apparatus according to claim 3, wherein when the image capturing device has been subjected to a manual pan operation, the control unit causes the image capturing device to move to a horizontal position with respect to a tilt direction.

9. The image capturing apparatus according to claim 3, wherein the control unit saves the importance level stored previously in the case where the operation amount when the image capturing device has been subjected to a manual pan operation is less than the predetermined amount.

10. The image capturing apparatus according to claim 3, wherein the searching unit determines an area having a high importance level as an area to search for the object.

11. The image capturing apparatus according to claim 3, wherein based on the importance level of each area, the image capturing device carries out an automatic image capturing in a case where the importance level is greater than a predetermined value.

12. A method for controlling an image capturing apparatus, the image capturing apparatus including an image capturing device that captures an object image, and the method comprising:

dividing a shooting angle of view of the image capturing device into a plurality of areas and calculating an importance level for each of the plurality of areas; and carrying out control so that the shooting angle of view of the image capturing device is changed to a wide-angle side, when the imaging direction of the image capturing device is changed, wherein in the calculating, the importance level for each of the plurality of areas is recalculated, when the imaging direction of the image capturing device is changed, and wherein in the carrying out control, the importance level stored previously in the case where an operation amount when the image capturing device has been subjected to a manual pan operation is greater than or equal to a predetermined amount is deleted.

13. A non-transitory computer-readable storage medium storing a program for causing a computer to execute the steps of a method for controlling an image capturing apparatus, the image capturing apparatus including an image capturing device that captures an object image, and the method comprising:

dividing a shooting angle of view of the image capturing device into a plurality of areas and calculating an importance level for each of the plurality of areas; and carrying out control so that the shooting angle of view of the image capturing device is changed to a wide-angle side, when the imaging direction of the image capturing device is changed, wherein in the calculating, the importance level for each of the plurality of areas is recalculated, when the imaging direction of the image capturing device is changed, and wherein in the carrying out control, the importance level stored previously is deleted in the case where an operation amount when the image capturing device has been subjected to a manual pan operation is greater than or equal to a predetermined amount.

14. A method for controlling an image capturing apparatus, the image capturing apparatus including an image capturing device that captures an object image, and the method comprising:

dividing a shooting angle of view of the image capturing device into a plurality of areas and calculating an importance level for each of the plurality of areas;

searching for an object in the image data captured by the image capturing device; and storing the importance level calculated by the calculating, wherein in the searching, an object is re-searched for in the image data captured by the image capturing device, when the imaging direction of the image capturing device is changed, and wherein the importance level stored previously is deleted in the case where an operation amount when the image capturing device has been subjected to a manual pan operation is greater than or equal to a predetermined amount.

15. A non-transitory computer-readable storage medium storing a program for causing a computer to execute the steps of a method for controlling an image capturing apparatus, the image capturing apparatus including an image capturing device that captures an object image, and the method comprising:

dividing a shooting angle of view of the image capturing device into a plurality of areas and calculating an importance level for each of the plurality of areas;

searching for an object in the image data captured by the image capturing device; and storing the importance level calculated by the calculating, wherein in the searching, an object is re-searched for in the image data captured by the image capturing device, when the imaging direction of the image capturing device is changed, and wherein the importance level stored previously is deleted in the case where the operation amount when the image capturing device has been subjected to a manual pan operation is greater than or equal to a predetermined amount.

* * * * *